United States Patent [19]
Watanabe et al.

[11] Patent Number: 5,012,417
[45] Date of Patent: Apr. 30, 1991

[54] MOTOR VEHICLE RUNNING CONTROL APPARATUS

[75] Inventors: Takashi Watanabe; Shusaku Fujimoto, both of Kariya; Kazunori Sakai, Aichi, all of Japan

[73] Assignees: Nippondenso Co., Ltd., Kariya; Toyota Jidosha Kabushiki Kaisha, Toyota, both of Japan

[21] Appl. No.: 319,202

[22] Filed: Mar. 6, 1989

[30] Foreign Application Priority Data

Mar. 4, 1988 [JP] Japan .................................. 63-52278

[51] Int. Cl.$^5$ .............................................. B60T 8/32
[52] U.S. Cl. .................. 364/426.02; 303/99; 303/103
[58] Field of Search ............ 364/426.02, 565, 566; 324/160, 161, 162; 303/97, 99, 103, 105

[56] References Cited

U.S. PATENT DOCUMENTS

| | | | |
|---|---|---|---|
| 4,468,740 | 8/1984 | Beck et al. | 364/426.02 |
| 4,497,026 | 1/1985 | Braschel et al. | 364/426.02 |
| 4,670,852 | 6/1987 | Masaki et al. | 364/426.02 |
| 4,718,013 | 1/1988 | Kubo | 364/426.02 |
| 4,849,890 | 7/1989 | Inoue et al. | 364/426.02 |

FOREIGN PATENT DOCUMENTS 60-35649 2/1985 Japan.

Primary Examiner—Gary Chin
Attorney, Agent, or Firm—Cushman, Darby & Cushman

[57] ABSTRACT

An apparatus for controlling running of a motor vehicle by measuring respective values of acceleration of the vehicle wheels, includes a digital low-pass filter for obtaining acceleration values by excluding high-frequency noise components of successive values of instantaneous acceleration which are obtained for each wheel at successive sampling intervals. Filter parameters such as the cut-off frequency can be controlled in accordance with the current operating conditions of the respective wheels, such as wheel velocity, to thereby provide optimum filter operation and hence substantially improved accuracy for the derived values of acceleration.

22 Claims, 12 Drawing Sheets

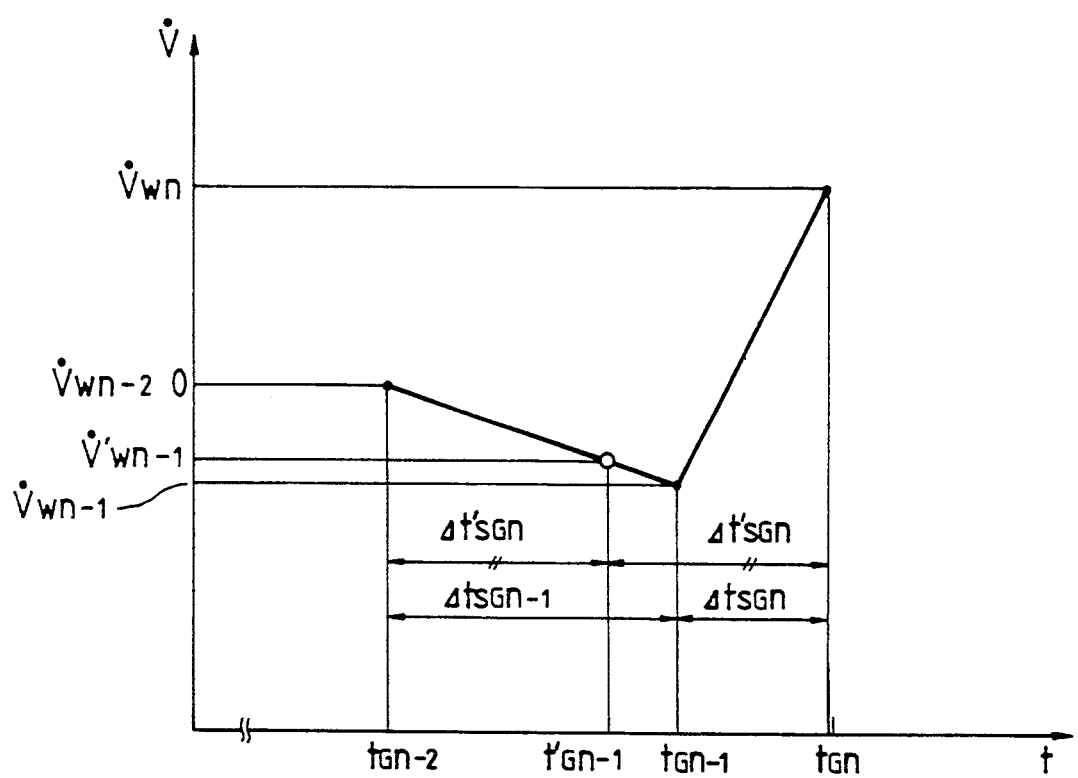

MOTOR VEHICLE RUNNING CONTROL APPARATUS

BACKGROUND OF THE INVENTION

1. Field of Applicable Technology

The present invention relates to an apparatus for controlling the running condition of a motor vehicle, based upon respective values of rotational acceleration of the vehicle wheels, and in particular to a computation apparatus for computing the wheel acceleration, for use in such a running control apparatus.

2. Prior Art Technology

Various proposals have been made in the prior art for controlling running conditions of a motor vehicle on the basis of respective values of acceleration of the road wheels of the vehicle. It should be noted that in the following, "road wheel" will be simply referred to as "wheel", "wheel rotational velocity" is referred to simply as "wheel velocity", and "wheel rotational acceleration" is referred to simply as "wheel acceleration". Among such proposals are a constant-speed drive control apparatus whereby the vehicle speed is controlled to be held at a target speed, a traction control apparatus which controls the degree of wheel skidding during acceleration, and an anti-skid control apparatus for preventing locking of the vehicle wheels during braking. With such prior art types of vehicle running control apparatus, the wheel acceleration is used to directly express any change in the running condition of the wheels. Since information which expresses a value of acceleration will also indicate whether this is actually acceleration or deceleration, excellent control results can be obtained by implementing control on the basis of vehicle wheel acceleration in this way.

Generally with such an apparatus, successive values of instantaneous wheel velocity (i.e. each measured over a very short time interval) are successively obtained and temporarily stored, and successive values of instantaneous wheel acceleration are obtained from these values of instantaneous wheel velocity. In the case of the anti-skid control apparatus which is disclosed in Japanese Patent Laid-open No. 60-35649, designating the most recently obtained value of wheel velocity as $V_{x0}$, the immediately previously obtained value of wheel velocity as $V_{x1}$, the time interval over which $V_{x0}$ was measured as $\Delta T_n$, the time interval used for measurement of $V_{x1}$ as $\Delta T_{(n-1)}$, then the instantaneous wheel acceleration $\dot{V}'W$ is given by the following equation:

$$\dot{V}w = \frac{V_{x0} - V_{x1}}{(\Delta T_n + \Delta T_{n-1})/2}$$

However the measured wheel velocity will include a large amount of high frequency noise components, resulting from vibration caused by the road surface, i.e. vibration of the vehicle and/or the attachment members which support the sensors used to measure wheel velocity). Since the instantaneous wheel acceleration is computed based upon this measured wheel velocity, the computed acceleration will also include large amounts of high frequency noise components. As a result, if control of the vehicle is directly executed based upon such a computed value of instantaneous wheel acceleration, then control failure can occur as a result of control processing becoming impossible to execute, due to the presence of such high frequency noise components.

SUMMARY OF THE INVENTION

It is an objective of the present invention to overcome the problems of the prior art described above, by providing a vehicle running control apparatus for controlling the running condition of a motor vehicle on the basis of wheel acceleration, in which filter processing is executed with a high degree of accuracy for excluding high frequency noise components of a derived value of wheel acceleration, to thereby enable a highly accurate value of wheel acceleration to be obtained. To ensure effective filter processing, certain parameters of the filter, such as the cut-off frequency, can be varied in accordance with information relating to the current status of a vehicle wheel.

This information relating to the vehicle wheels can include wheel velocity data, information indicating whether acceleration measurement is currently being executed for a drive wheel or a driven wheel, or information concerning the durations of sampling intervals at which successive values of wheel velocity are obtained. Specifically, such information can be used to select sets of filter coefficient values which will provide appropriate filter processing operation to most effectively exclude high frequency components from the values of acceleration that are obtained as outputs from the filter processing.

The filter processing is preferably executed by digital low-pass filter operation, so that the values of filter coefficients can be freely determined by a computer program. The filter parameters which can thus be modified by adjustment of the filter coefficients include the cut-off frequency used for low-pass filter processing to exclude high frequency noise components, the type of filter (e.g. second-order low-pass filter, third-order low-pass filter, Chebyshev filter response or Butterworth response, etc). Enhanced accuracy can thereby be achieved for the values of wheel acceleration which are derived by such an apparatus.

More specifically, to achieve the objectives set out above, a vehicle running control apparatus according to the present invention comprises wheel acceleration signal generating means for generating wheel acceleration signals representing respective values of rotational acceleration of each of a set of road wheels of a vehicle and wheel velocity signals representing respective values of rotational velocity of the wheels, and means for controlling a running condition of the vehicle based upon the wheel acceleration signals and wheel velocity signals, and is characterized in that the wheel acceleration signal generating means comprises, for each of the wheels:

wheel velocity detection means for detecting a velocity of the wheel and producing data representing the wheel velocity;

instantaneous wheel acceleration computation means for computing successive values of instantaneous wheel acceleration from the wheel velocity data, and producing an instantaneous wheel acceleration signal representing the successive values;

filter processing means for processing the instantaneous wheel acceleration signal to substantially exclude high frequency components of that signal which are above a predetermined filter cut-off frequency, to thereby obtain a wheel acceleration signal representing a value of acceleration of the wheel;

filter cut-off setting means for setting the filter cut-off frequency in accordance with a specific condition of the wheel; and running control means for controlling a running condition of the vehicle in accordance with the wheel acceleration signal.

Due to the configuration set out hereinabove for a vehicle running control apparatus according to the present invention, filter parameters such as the cut-off frequency can be set in accordance with various conditions relating to the wheel. For example, if the wheel is currently rotating within a predetermined high velocity range, then the cut-off frequency can be set to a predetermined high value, while if the wheel velocity is in a low range, the cut-off frequency can be set to a lower value, thereby ensuring optimum exclusion of high-frequency noise components of the resultant acceleration signal for both of these velocity ranges. Once an appropriate value of cut-off frequency has been determined in this way, appropriate filter coefficients can then be derived for producing that cut-off frequency value. These filter coefficients can for example be selected from among a plurality of predetermined sets of filter coefficient values, corresponding to respectively different values of cut-off frequency. In this way, the filter parameters can be selected to provide optimum filter processing for the current status of each wheel. Filter processing of successively obtained values of instantaneous wheel acceleration is executed using these coefficient values, to obtain an accurate wheel acceleration signal, with the aforementioned high frequency noise components effectively excluded. The invention thereby enables enhanced accuracy of control of a motor vehicle to be achieved, based upon the value of wheel acceleration that is obtained as a result of the filter processing, without it being necessary to alter the condition of a brake actuator or other device in order to obtain such enhanced accuracy of control.

DESCRIPTION OF PREFERRED EMBODIMENTS

Figure 1:
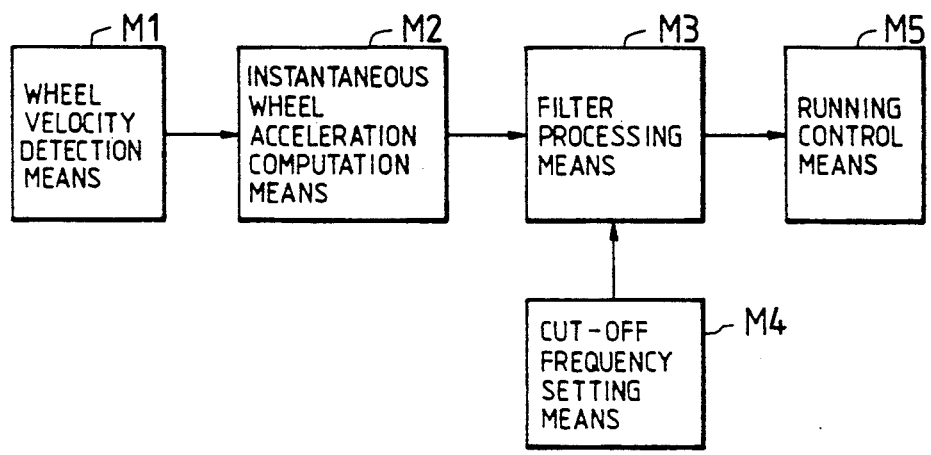
FIG. 1 is a block diagram for illustrating the basic principles of the present invention.

FIG. 1 is a block diagram for illustrating the basic principles of embodiments of a vehicle running control apparatus according to the present invention in which a filter cut-off frequency can be varied for enhanced filter effectiveness. As shown, such an apparatus essentially comprises wheel velocity sensing means M1, which produces a wheel velocity signal (e.g. comprising successive values of instantaneous wheel velocity) that is supplied to instantaneous wheel acceleration computation means M2, to obtain an instantaneous wheel acceleration signal (comprising successive values of instantaneous wheel acceleration). This is transferred through filter processing means M3 which functions as a low-pass filter to exclude frequency components which are higher than a cut-off frequency $f_c$, to obtain an acceleration signal to vehicle running control means M5. In addition, cut-off frequency setting means M4 are provided, for setting a suitable value of the cut-off frequency $f_c$ for the filter processing means M3, with this cut-off frequency $f_c$ being determined in accordance with one or more conditions relating to the wheel, such as whether the wheel velocity is in a high or a low range, or whether the wheel is a drive wheel or a driven wheel, for example.

Figure 2:
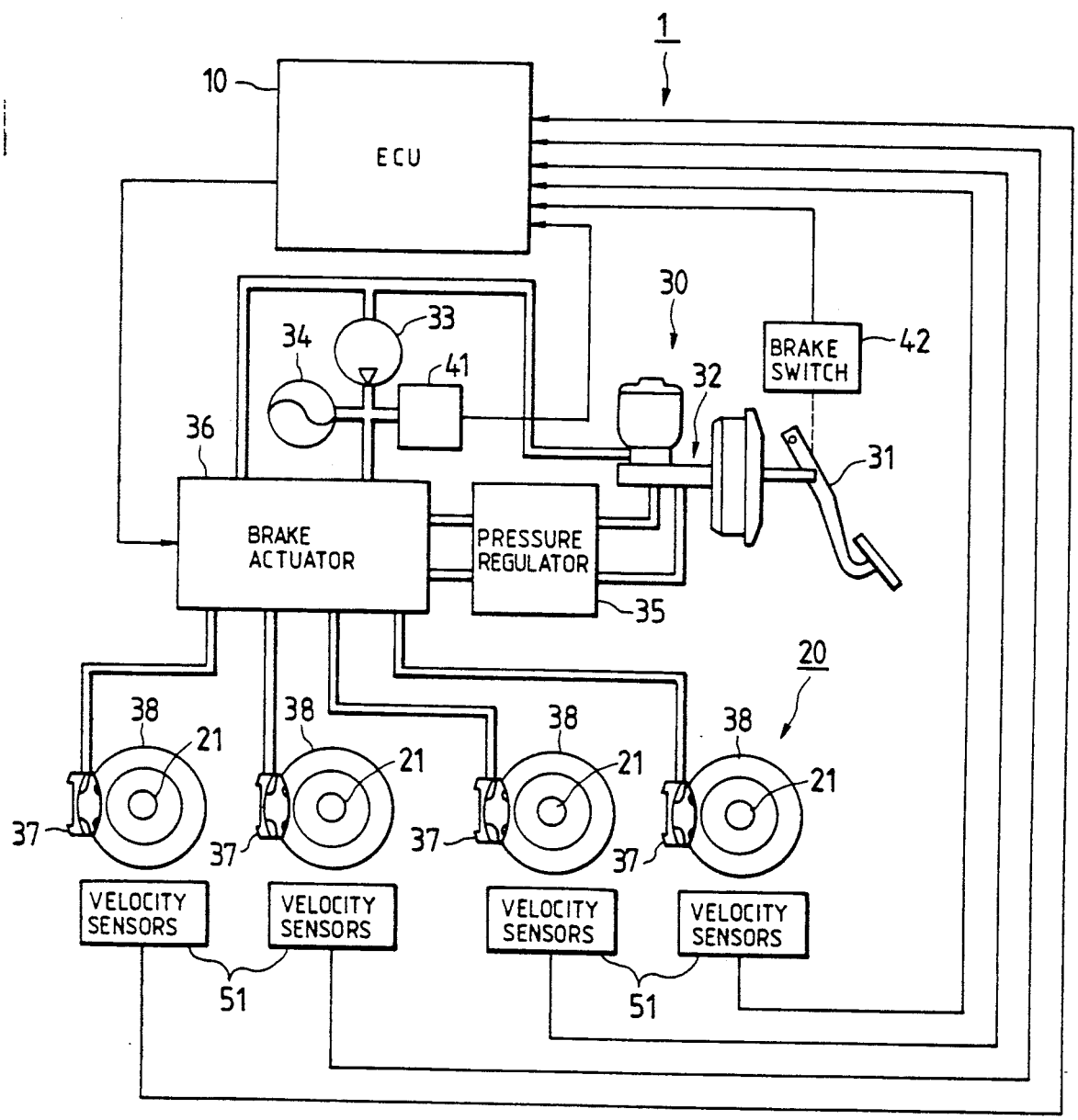
FIG. 2 is a diagram for illustrating the overall configuration of an anti-skid control apparatus for a vehicle according to the present invention.

An embodiment of the present invention which is an anti-skid control apparatus, will be described referring to the drawings. An anti-skid control apparatus functions during braking of a vehicle to prevent wheel lock from occurring and to thereby reduce the possibility of skidding. FIG. 2 is a diagram showing the general configuration of this apparatus, in which numeral 10 denotes an electronic control unit (ECU) which contains a microcomputer, 20 denotes the four road wheels of the vehicle, numeral 30 denotes a braking system which controls the degree of braking force that is applied. Numeral 21 denotes each of the axles of the wheels 20. The braking system 30 comprising a brake pedal 31, a master cylinder 32, a pump 33, an accumulator 34, a pressure regulator 35, a brake actuator 36, a wheel cylinder 37, and brake disks 38 of respective ones of the wheels 20. Hydraulic pressure that is generated by the master cylinder 32 is transmitted to each of the wheel cylinders 37, with the respective values of hydraulic pressure thus applied to the wheel cylinders 37 being controlled by a plurality of electromagnetic valves (not shown in the drawings) of the brake actuator 36. Although not shown in the drawing, each of the wheel cylinders 37 is provided with a brake pad which executes braking by friction when pressed against the corresponding brake disk 38. The ECU 10 receives as inputs thereto signals which are respectively produced from a set of four wheel velocity sensors 51, which are provided for respective ones of the wheels 20. In this embodiment, the wheels 20 include both drive wheels and driven wheels. Signals produced from a brake switch 42 are also input to the ECU 10. The ECU 10 executes predetermined computation processing a plurality of electromagnetic valves of the brake actuator 36 are driven such as to regulate the respective values of hydraulic pressure supplied to the wheel cylinders 37 of the wheels 20.

Figure 3:
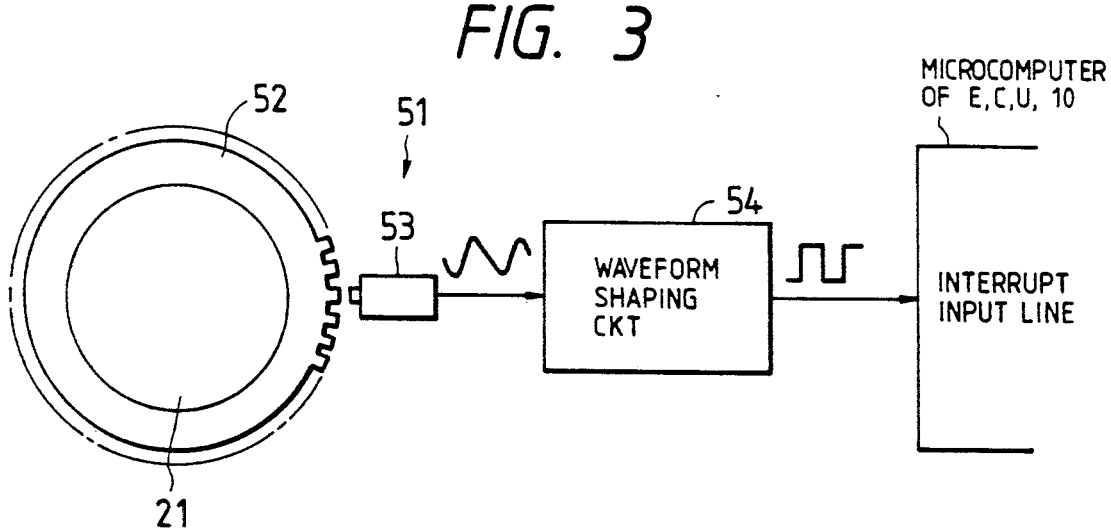
FIG. 3 illustrates a wheel velocity sensing portion of the apparatus of FIG. 2, for one wheel of the vehicle.

FIG. 3 illustrates a wheel velocity sensor 51 for one of the wheels 20. As shown, the wheel velocity sensor 51 is formed of a signal rotor 52 which rotates together with the wheel, and a magnetic pick-up 53. The signal rotor 52 has 96 teeth formed at equidistant spacings around its periphery, and the resultant output signal from the pick-up 53 is transferred through a waveform shaping circuit 54, to thereby obtain an output signal, referred to in the following as a wheel velocity detection signal, comprising a train of rectangular pulses. This signal is applied to an interrupt input of the microcomputer of the ECU 10, In response to each wheel velocity pulse, the microcomputer increments a count value held in a register, with that count value being used to obtain values of instantaneous wheel velocity as described hereinafter.

Figure 4:
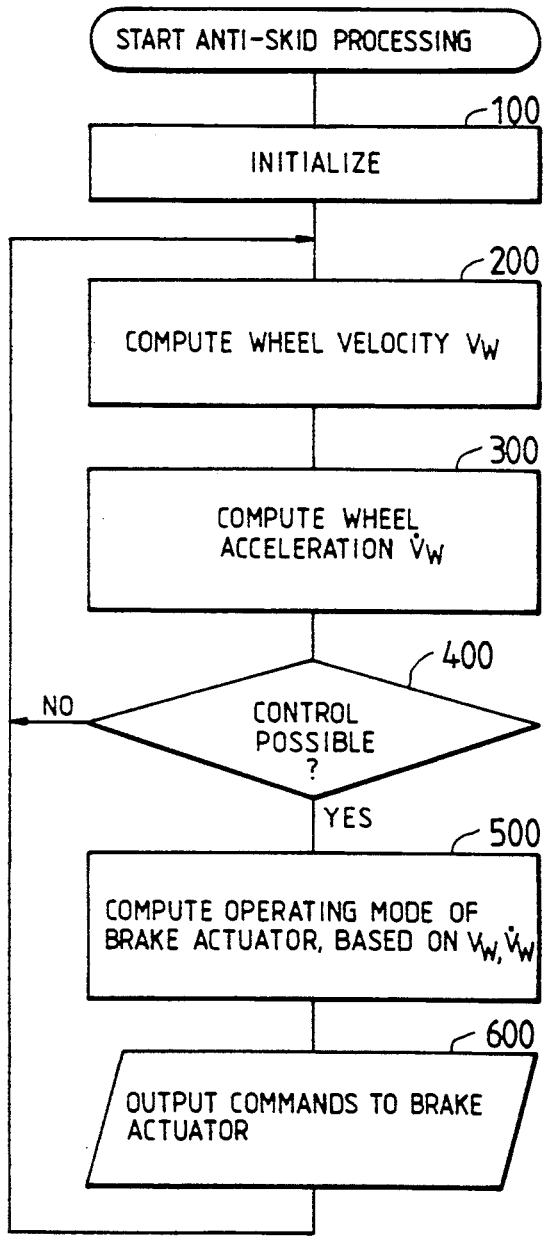
FIG. 4 is a flow diagram to illustrate the basic principles of anti-skid control by the apparatus of FIG. 2.

The operation of this apparatus will be described referring to FIGS. 4, 5, 6 and 7 which are flow charts of processing that is executed by the microcomputer of the ECU 10. FIG. 4 is an overall flow chart of the main routine of this processing for anti-skid control. The following description will be for processing relating to a single wheel, but it will be understood that similar processing is executed for each of the wheels. Processing is initiated when power to the ECU 10 is switched on. In step 100, initialization is executed. In step 200, the wheel velocity $V_W$ is computed. With this embodiment, control of each of the four wheels 20 is executed, and so respective values of wheel velocity $V_W$ are computed for each of the wheels 20. In step 300, the wheel acceleration $\dot{V}_W$ is computed.

In step 400, a decision is made as to whether or not anti-skid control can be started. This decision is based upon a number of different conditions, such as, for example, whether the brake switch 42 has sensed that the brake pedal 41 has been depressed, whether or not the wheel acceleration $\dot{V}_W$ is lower than a predetermined value $-\dot{V}_s$, whether a slip factor S (obtained from the vehicle velocity $V_M$ by the equation given below) is greater than a predetermined value, etc. The aforementioned equation is:

$$S = \frac{V_W - V_M}{V_M} \times 100 \, (\%)$$

In step 500, the respective operation modes for the electromagnetic valves of the brake actuator 36 are computed, based upon the values of wheel velocity $V_W$ and wheel acceleration $\dot{V}_W$ which have been respectively computed in steps 200 and 300. For example, if the electromagnetic valves for the wheel cylinders 37 have three possible different operating modes whereby the hydraulic pressure is increased, decreased, or held constant, respectively, then if the wheel acceleration value indicates that a wheel is beginning to lock, the corresponding one of the electromagnetic valves would be set to the "reduce hydraulic pressure" mode. Subsequently, when normal wheel rotation has been restored, that valve would be set to the "increase hydraulic pressure" mode.

In step 600, command signals are output to the brake actuator 36, to implement the operating modes that have been derived in step 500. Thereafter, the processing steps from 200 through 600 are cyclically executed, to thereby maintain the vehicle under the driver's control, without the danger of skidding occurring.

The operation steps 500 and 600 described above can be implemented in various ways, depending upon the configuration of the control system. For example, in step 500, respective target values of hydraulic pressure might be computed for each of the wheel cylinders 37, while in step 600, hydraulic servo control might be executed to maintain the pressures for the respective wheel cylinders at their target values.

Figure 5:
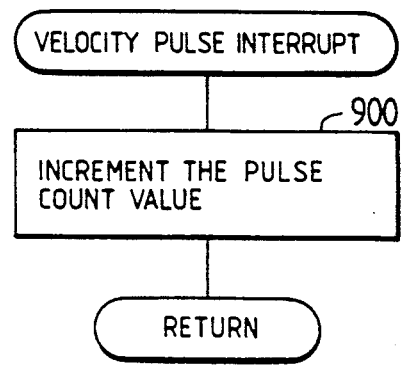
FIGS. 5, 6 and 7 are flow diagrams for illustrating the operation of a first embodiment of an anti-skid apparatus according to the present invention.
Figure 8:
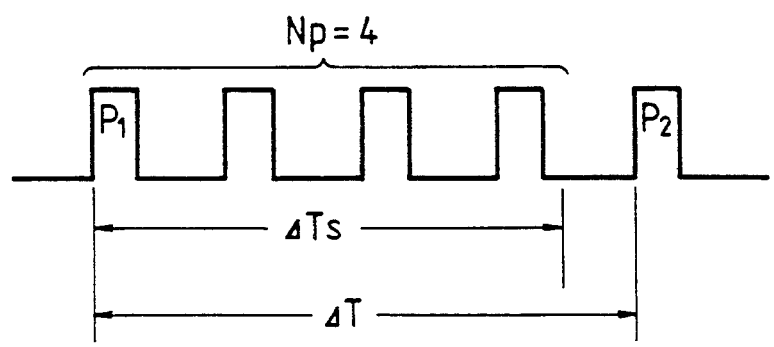
FIG. 8 is a timing diagram for the flow diagram of FIG. 5.

FIG. 5 is a flow chart of wheel velocity pulse computation processing, that is executed during each of successive sampling intervals $\Delta T$ as described in the following. The operation will be described referring also to the waveform diagram of FIG. 8. When a first pulse of the wheel velocity detection signal (from waveform shaping circuit 54, as described hereinabove) is produced, that pulse acts as a first interrupt pulse (e.g. pulse $P_1$ in FIG. 8) for the microcomputer of the ECU 10. A count value of a register is then incremented by one, from an initial value of zero. Thereafter, an interrupt occurs and the count value is incremented each time that a wheel velocity detection pulse is produced. This occurs successively during an elapsed time interval $\Delta T$ which extends from the first one of the wheel velocity detection signal pulses ($P_1$ in FIG. 8), extending through a fixed-duration time interval $\Delta T_s$, to the next one of the wheel velocity detection signal pulses ($P_2$ in FIG. 8) that occurs following the end of the interval $\Delta T_s$. A count value $N_p$ of the number of wheel velocity detection pulses which occurred during $\Delta T$ is thereby obtained. In addition, the value of the elapsed time interval $\Delta T$ is measured. When the aforementioned pulse $P_2$ occurs, thereby terminating the elapsed time interval $\Delta T$, the count begins again, from zero as before, and the above process is repeated to obtain new values for Np and the duration of $\Delta T$.

This processing is repetitively executed, during each of successive $\Delta T$ intervals. It will be understood that, although $\Delta T_s$ is fixed, $\Delta T$ will vary to a certain extent in accordance with wheel velocity. Thus, the above processing to obtain values of $N_p$ and $\Delta T$ is repeated at intervals which are only approximately equal to $\Delta T_s$, and are not of precisely fixed duration.

Figure 6:
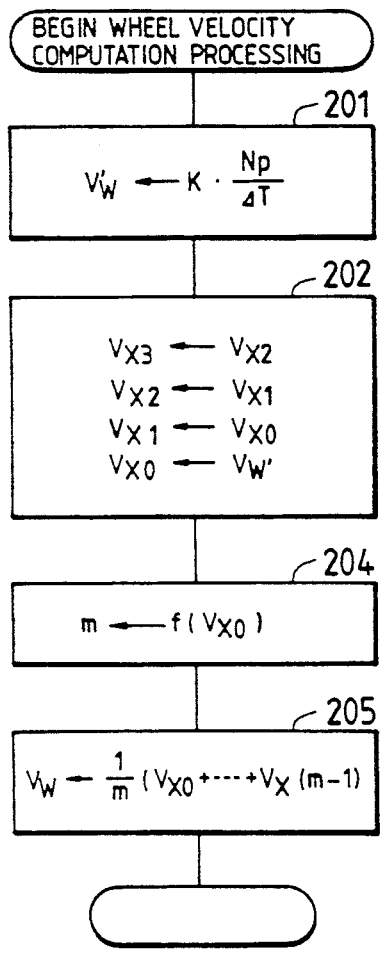

FIG. 6 is a flow chart showing the computation processing that is executed to obtain the wheel velocity $V_W$ by utilizing successive values of $N_p$ and $\Delta T$, corresponding to step 200 in FIG. 4. In a first step 201, a value of instantaneous wheel velocity $V'_W$ is computed, by utilizing the equation:

$$V'_W = K \cdot N_p / \Delta T$$

where $N_p$ is the number of velocity detection pulses which are counted during the elapsed time $\Delta T$, and $\Delta T$ is the value of that elapsed time, respectively obtained as described hereinabove. K is a coefficient.

In step 202, values of instantaneous wheel velocity which have been obtained in successive executions of the processing flow of FIG. 6 are interchanged between a set of registers of the microcomputer of the ECU 10.

(It should be noted that although in the following description it will be assumed that separate dedicated registers are utilized to temporarily store respective values of instantaneous wheel velocity and instantaneous acceleration, it would of course be equally possible to use some other form of memory, such as a RAM of the microcomputer of the ECU for this temporary storage function.) The aforementioned registers will be respectively referred to as the $V_{x0}$, $V_{x1}$, $V_{x2}$ and $V_{x3}$ registers, and the respective values which are left held in these registers following completion of step 202 will be referred to as $V_{x0}$, $V_{x1}$, $V_{x2}$ and $V_{x3}$. In step 202, first the value $V_{x2}$ is transferred from the $V_{x2}$ register to the $V_{x3}$ register, then the value $V_{x1}$ is transferred from the $V_{x1}$ register to the $V_{x2}$ register, the value $V_{x0}$ is transferred from the $V_{x0}$ register to the $V_{x1}$ register, and the most recently obtained value of instantaneous wheel velocity $V'_W$ that has been computed in step 201 is transferred to the $V_{x0}$ register. In this way, the values $V_{x0}$ to $V_{x3}$ are respectively updated for a wheel once in each execution of the flow sequence shown in FIG. 6.

In step 204, a number m is derived, which is utilized to compute the wheel velocity $V_W$. The value of m is derived based on the updated value of instantaneous wheel velocity $V'_W$ that has just been stored in the register $V_{x0}$, i.e. the new value $V_{x0}$. This number m can be derived for example from a stored table or "memory map" of relationships between values of m and values of instantaneous wheel velocity $V'_W$ Such a map relationships can for example be of the form graphically illustrated in FIG. 9. Alternatively, m can be obtained as a predetermined function $f(V_{x0})$ of the value $V_{x0}$ In step 205, averaging processing is executed to compute the wheel velocity $V_W$, utilizing the number m, as follows:

$$V_W = \frac{(V_{x0} + \ldots + V_{x(m-1)})}{m}$$

In this way, an updated value of wheel velocity $V_W$ is obtained as an average of m successively computed values of wheel instantaneous velocity.

The above processing has been described for a single wheel. However it will be apparent that identical processing can be executed concurrently for each of the vehicle wheels, using a single microcomputer, to obtain successive updated values of wheel velocity for each of the wheels. In that case, the wheel detection signals for each of the wheels would be applied to respective interrupt input lines of the microcomputer.

Figure 7:
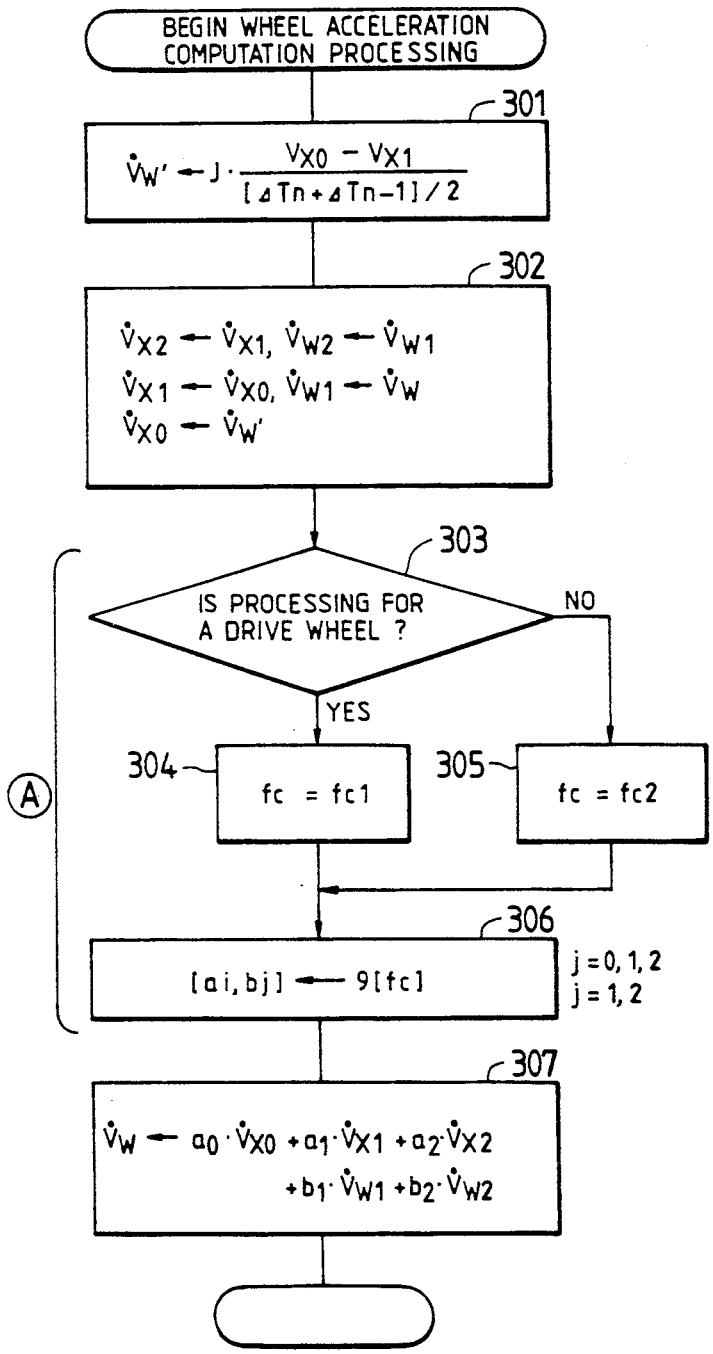

FIG. 7 is a flow chart showing the processing operations for implementing step 300 of FIG. 4, to obtain the acceleration $\dot{V}_W$ of a wheel. This embodiment will be described for the case in which digital filter processing is utilized. In step 301, the value of instantaneous wheel velocity $V_{x1}$ (obtained in the immediately preceding execution of the flow sequences of FIGS. 6 and 7) and the corresponding elapsed time interval $\Delta T_{(n-1)}$ which was used in computing that value $V_{x1}$, together with the most recently obtained value $V_{x0}$ of instantaneous wheel velocity and the corresponding elapsed time $T_n$, are used in conjunction with a coefficient J to obtain the instantaneous wheel acceleration $\dot{V}'_W$ from the following equation:

$$\dot{V}_W = J \cdot \frac{V_{x0} - V_{x1}}{\frac{(\Delta T_n + \Delta T_{n-1})}{2}}$$

In step 302, the contents of a set of five registers of the microcomputer of the ECU 10 are interchanged. Of these, a set of three registers which serve to hold successively obtained values of instantaneous wheel acceleration will be respectively designated as the $\dot{V}_{x2}$, $\dot{V}_{x1}$ and $\dot{V}_{x0}$ registers, and the values held in these registers after execution of step 302 will be respectively designated as the instantaneous wheel acceleration values $\dot{V}_{x2}$, $\dot{V}_{x1}$ and $\dot{V}_{x0}$. In addition, two registers which serve to hold values of wheel acceleration that have been subjected to filter processing (as described hereinafter) are respectively designated as the $\dot{V}_{w1}$ and $\dot{V}_{w2}$ registers, and the values of wheel acceleration which are held in these after execution of step 302 will be designated as the $\dot{V}_{w1}$ and $\dot{V}_{w2}$ values respectively. In step 302, updating of the contents of these registers is executed as follows. The value of instantaneous wheel acceleration held in the $\dot{V}_{x1}$ register is transferred to the $\dot{V}_{x2}$ register, the value held in the $\dot{V}_{x0}$ register is transferred to the $\dot{V}_{x1}$ register, and the new value of instantaneous wheel acceleration (computed in the preceding step 301) is transferred into the $\dot{V}_{x0}$ register. In addition, the value of (digitally filtered) wheel acceleration held in the $\dot{V}_{w1}$ register is transferred to the $\dot{V}_{w2}$ register, and the recently computed value of wheel acceleration $\dot{V}_W$ (obtained from digital filter processing in the immediately preceding execution of this processing sequence) is transferred to the $\dot{V}_{w1}$ register. As in the case of computation of successive values of the wheel velocity $V_W$, updated wheel acceleration $\dot{V}_W$ values are successively computed at sampling intervals substantially equal to $\Delta T_s$.

In step 303, a decision is made as to whether or not the processing that is currently being executed is for a drive wheel of the vehicle. For a conventional (e.g. 2-wheel drive) vehicle, this decision may be made by the microcomputer of the ECU 10 based upon the statuses of flags which are respectively set for each of the four wheels 20. Alternatively, the decision can be made based upon wheel acceleration processing being executed in a fixed sequence for successive ones of the wheels 20. However this embodiment is also applicable to a "part-time 4-wheel drive" motor vehicle, in which certain wheels may sometimes be coupled to the vehicle transmission to be used as drive wheels, and at other times will be used as driven wheels. In that case, the microcomputer can distinguish between whether a wheel is in the drive condition or the driven condition, based upon detection of a changeover operation that is executed to change from 4-wheel drive to 2-wheel drive i.e. by detection of a signal produced by a switch that is actuated by the mechanism which executes such a changeover operation.

If the wheel that is currently being processed is judged to be a drive wheel, then processing proceeds to step 304. If it is not judged to be a drive wheel, then processing proceeds to step 305. In step 304, a comparatively low value of cut-off frequency $f_{cl}$ is set for digital filter processing that will subsequently be applied to the instantaneous wheel acceleration $\dot{V}'_W$ values to derive the wheel acceleration $\dot{V}_W$. In step 305, a comparatively high value of cut-off frequency $f_{c2}$ ($>f_{c1}$) is set for the digital filter processing.

Figure 9:
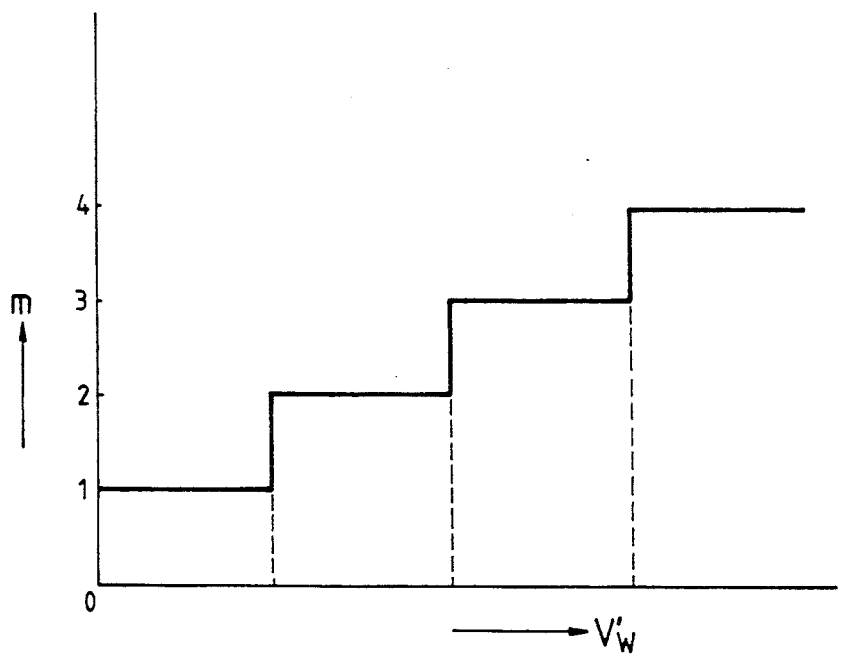
FIG. 9 is a graph illustrating a relationship between values of instantaneous wheel velocity and a number m, used in the flow diagram of FIG. 6.
Figure 10:
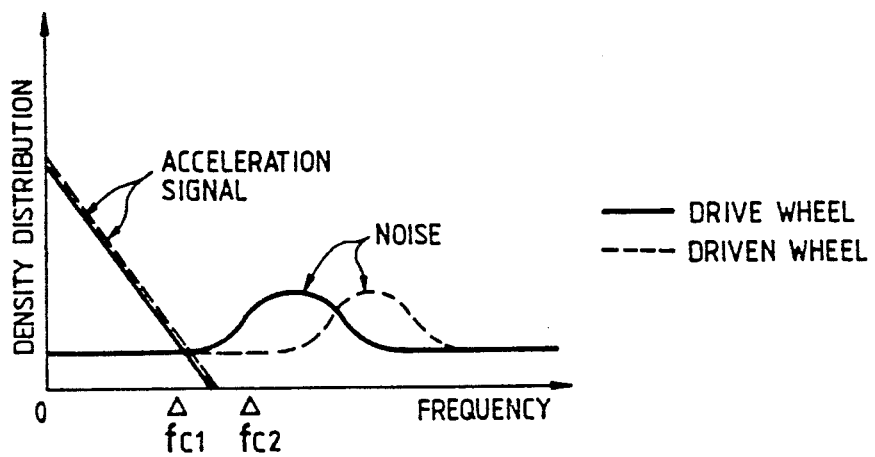
FIGS. 10 and 11 are diagrams illustrating true acceleration components and noise components of an acceleration signal.

The approximate relationships between the high frequency noise components, the vehicle acceleration and the cut-off frequency $f_c$ are shown in FIG. 9 for the respective cases of a drive wheel (full-line portions) and a driven wheel (broken-line portions). The density distributions of the true acceleration components of the instantaneous acceleration signal (i.e. this signal comprising the successive digital values of instantaneous acceleration which are obtained in step 301 of FIG. 7 in successive sampling intervals) are confined, as shown, to a low range of frequencies. Since a drive wheel of a motor vehicle is coupled to the vehicle transmission, i.e. to a drive shaft, gears, etc., a drive wheel has a much greater value of rotational inertia than a driven wheel. As a result, the large-amplitude high frequency noise components of a drive wheel occur in a lower range of frequencies than those of a driven wheel, as shown in FIG. 10. For this reason, it is advantageous to set the cut-off frequency for filter processing to exclude these high frequency components to a relatively low value ($f_{c1}$) when acceleration computation is being executed for a drive wheel, and to a relatively high value ($f_{c2}$) in the case of a driven wheel. This ensures that a maximum level of the true acceleration components are passed by the filter, in the case of a driven wheel, and sufficient noise exclusion for the case of a drive wheel.

In step 306 of FIG. 7, a set of values for digital low-pass filter coefficients $a_i$, $b_j$ are computed, where $i=0, 1, 2$ and $j=1, 2$. These filter coefficient values are computed based upon an assumed value of the sampling period for digital filter processing (i.e. the period of successively deriving updated values of instantaneous wheel acceleration), and upon the cut-off frequency that has been set in steps 304 or 305. These filter coefficient values can be obtained from a map which is stored in the memory of the microcomputer of the ECU 10, and relates respective cut-off frequency values $g(f_c)$ to corresponding predetermined sets of values for the filter coefficients ($a_i$, $b_j$). Alternatively, these filter coefficient values can be obtained as functions of the cut-off frequency value. By changing the values of the filter coefficients ($a_i$, $b_j$) in this way, the digital filter characteristics can be freely altered.

As stated hereinabove, the value of $\Delta T$, and hence the value of the sampling period for filter processing, is not fixed. However it will be apparent from FIG. 8 that if the wheel velocity is sufficiently high (so that the period of the wheel detection pulses is substantially less than $\Delta Ts$), then the sampling period will be sufficiently constant to ensure satisfactory filter accuracy, and will be approximately equal to $\Delta Ts$.

In step 307 of FIG. 7, low-pass digital filter processing is executed to obtain the wheel acceleration $\dot{V}_W$, using the values of instantaneous wheel acceleration which are currently held in the $\dot{V}_{x0}$, $\dot{V}_{x1}$, $\dot{V}_{x2}$ registers and the values of wheel acceleration held in the $\dot{V}_{w1}$ and $\dot{V}_{w2}$ registers, and the values for the filter coefficients ($a_i$, $b_j$) that have been obtained in step 306. This digital filter processing is in accordance with the following equation, to obtain an updated value for the wheel acceleration $\dot{V}_W$:

$$\dot{V}_W = a_0 \cdot \dot{V}_{x0} + a_1 \cdot \dot{V}_{x1} + a_2 \cdot \dot{V}_{x2} + b_1 \cdot \dot{V}_{w1} + b_2 \cdot \dot{V}_{w2}$$

Thus, with the first embodiment described above, low-pass digital filter processing is executed by the microcomputer of the ECU 10, with this filter processing being freely controllable by software, so that the filter parameters such as the cut-off frequency can be freely altered by means of a program. In this way, respective acceleration processing for each of the four wheels of a vehicle can be executed using a single microcomputer, and the values of cut-off frequency used in filter processing executed to obtain values of acceleration for the respective wheels are varied in accordance with whether the wheel is a drive wheel or a driven wheel, for improved filter effectiveness.

With the above embodiment, wheel velocity sensors are used as means to detect the wheel velocity, while the processing executed in step 301 of FIG. 7 constitutes means for computing values of instantaneous wheel acceleration, step 307 of FIG. 7 constitutes means for executing filter processing, and the combination of processing steps 303 through 306 indicated by A in FIG. 7 constitutes means for setting the filter cut-off frequency. In addition, steps 500 and 600 in FIG. 4 constitute means for control of vehicle running.

Figure 11:
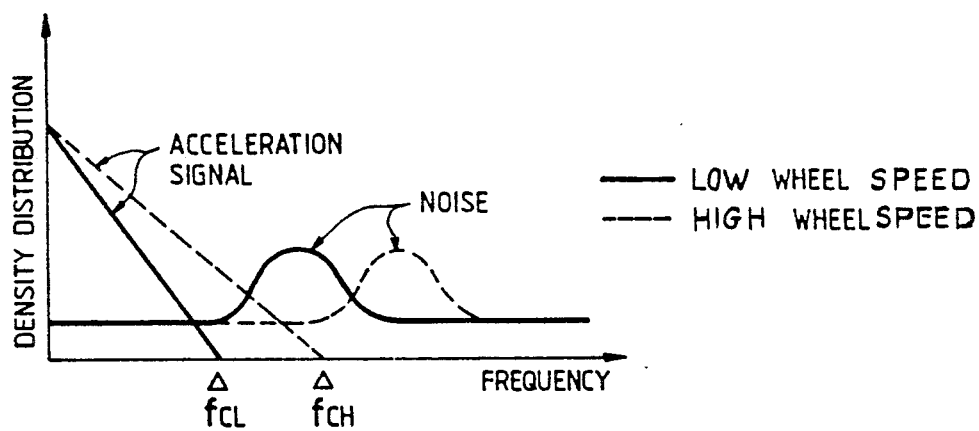
Figure 12:
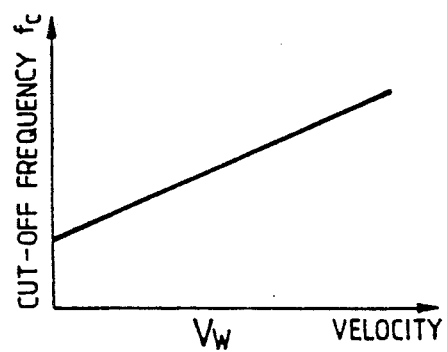
FIG. 12 is a graph of a relationship between filter cut-off frequency and wheel velocity, for assistance in describing a second embodiment of an anti-skid apparatus according to the present invention.

A second embodiment of the invention will now be described, which is also applicable to an anti-skid control apparatus, in which the cut-off frequency used for digital filter processing is made variable in accordance with wheel velocity. As shown in FIG. 11, as the wheel velocity increases, density distribution regions of the true acceleration frequency components and the high frequency noise components contained the wheel acceleration signal are both moved upward in frequency. This is due to the fact that a pulse train signal that varies in frequency with wheel velocity is used to detect the value of wheel velocity. Thus, as the wheel velocity $V_W$ becomes higher, the pulse width and pulse period of that pulse train signal become respectively shorter. For this reason with the second embodiment of the invention, as shown in FIG. 12, the value of the cut-off frequency $f_c$ that is used for low-pass filter processing of the instantaneous wheel acceleration $\dot{V}'_W$ is increased as the wheel velocity $V_W$ increases.

Figure 13:
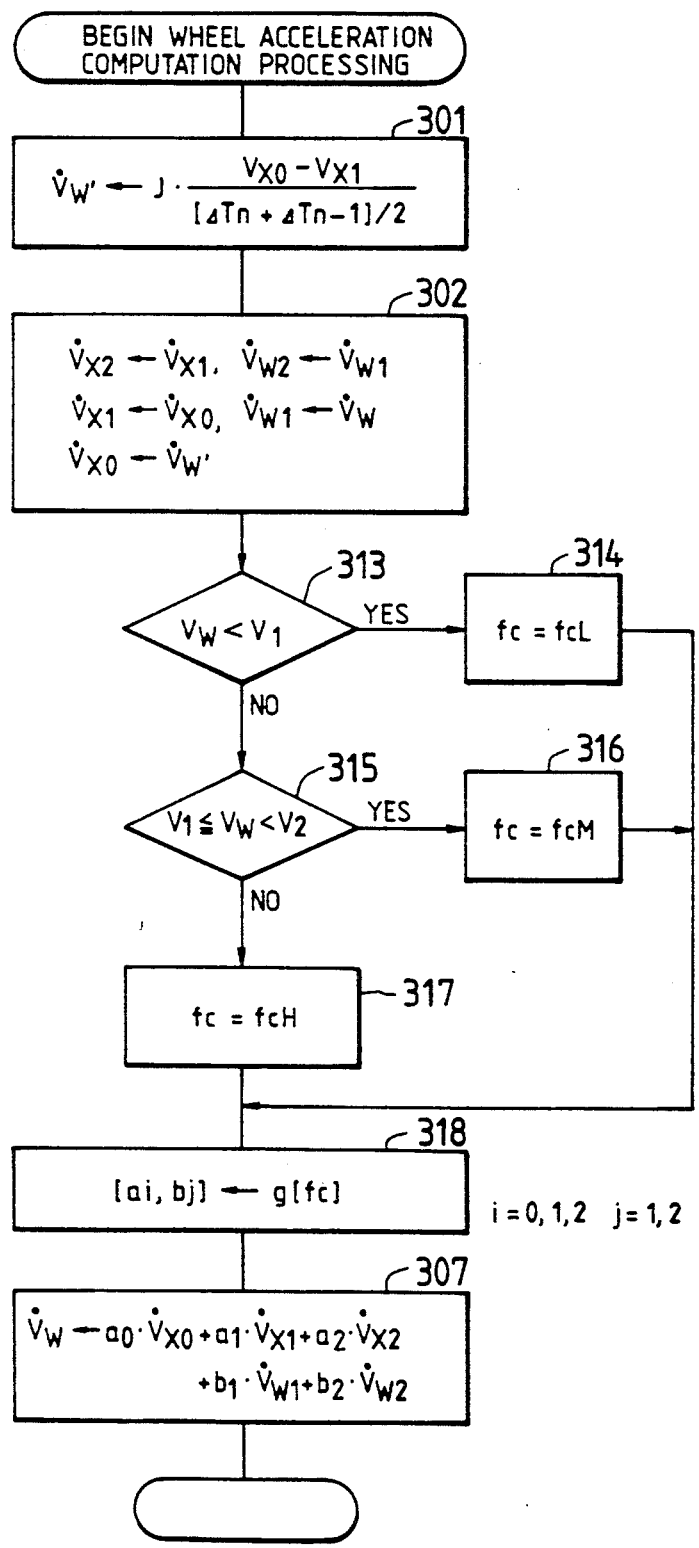
FIGS. 13, 14 and 15 are flow charts for assistance in describing second, third and fourth embodiments of an anti-skid apparatus according to the present invention.

FIG. 13 is a flow chart of the computation processing executed with this second embodiment to obtain the wheel acceleration $\dot{V}_W$, this processing corresponding to step 300 in the main routine shown in FIG. 4. Prior to this processing, an updated value of wheel velocity $V_W$ is obtained, by the same processing steps as for the first embodiment. In the first step 301 in FIG. 13, computation of a new value of instantaneous wheel acceleration $\dot{V}'_W$ is executed as for step 301 in FIG. 7 described above for the first embodiment, while in step 302 processing is executed to update the values held in the $\dot{V}_{x0}$ to $\dot{V}_{x2}$ and $\dot{V}_{w1}$, $\dot{V}_{w2}$ registers, as for step 302 of FIG. 7. However in the next step 313 of this second embodiment, the aforementioned updated value of wheel velocity $V_W$ is compared with a predetermined first reference velocity V1.

If it is judged in step 313 that the wheel velocity $V_W$ is lower than first reference velocity V1, then processing proceeds to step 314. In step 314, a value of cut-off frequency $f_{CL}$ is determined for digital low-pass filter processing, which is appropriate for a low range of wheel velocity (as illustrated in FIG. 11). If it is judged in step 313 that the wheel velocity $V_W$ is not less than the first reference velocity V1, then processing proceeds to step 315.

In step 315, the wheel velocity $V_W$ is compared with a predetermined second reference velocity V2. If it is judged in step 315 that the wheel velocity $V_W$ is lower than the second reference velocity V2, then processing proceeds to step 316, in which a value of cut-off frequency $f_{cm}$ is set for digital low-pass filter processing, which is appropriate for a medium range of wheel velocity (i.e. the range between V1 and V2). If it is judged in step 315 that the wheel velocity $V_W$ is not less than the second reference velocity V2, then processing proceeds to step 317, in which a value of cut-off frequency $f_{CH}$ is set for digital low-pass filter processing, which is appropriate for a high range of wheel velocity.

In step 318, low-pass digital filter coefficients ($a_i$, $b_j$), where i=0, 1, 2 and j=1, 2, are obtained in accordance with the value of cut-off frequency $f_c$ that has been derived in step 313, 314 or 317. These coefficient values can be obtained from a stored "memory map" table which relates cut-off frequency values to sets of coefficient values, or can be computed using predetermined functions.

In the next step 307, a new value of wheel acceleration $\dot{V}_W$ is derived by digital filter processing, using the filter coefficient values determined in step 318, in the same way as for step 307 of FIG. 7 described hereinabove.

Thus with the second embodiment, a cut-off frequency $f_c$ for digital filter processing of the instantaneous wheel acceleration $\dot{V}'_W$ is determined in accordance with whether the wheel velocity is in a low range, a medium range, or a high range. As a result, filter processing can be executed to attain a high degree of noise exclusion and hence improved accuracy for the value of wheel acceleration $\dot{V}_W$ that is obtained, irrespective of the current speed of the vehicle.

It should be noted that it would be possible to obtain even greater improvements in digital filter effectiveness in exclusion of high frequency noise components, if the features of the first embodiment were to be combined with those of the second embodiment described above, i.e. such that the cut-off frequency $f_c$ for digital filter processing is determined in accordance with the value of wheel velocity and also in accordance with whether the wheel that is being processed is a drive wheel or a driven wheel.

Furthermore, in the second embodiment described above, two reference velocities are used for decision operations. However if a greater number of reference velocities and corresponding decision operations were to be used, an even higher degree of effectiveness of noise exclusion by filter processing could be achieved.

Moreover, it would also be possible to utilize a value of vehicle velocity rather than wheel velocity, for comparison with predetermined reference velocity values. That is to say, the vehicle velocity could be estimated (by computer processing) based upon the wheel velocity values for the respective wheels, and this vehicle velocity then successively compared with two reference velocity values V1, V2. In that case, it is necessary for the system to correctly judge, from the relative velocities of the respective wheels, whether each wheel velocity actually corresponds to the vehicle velocity, i.e. to judge whether or not a wheel is slipping to some degree on the road surface.

A third embodiment of the invention will now be described, in which wheel acceleration computation processing is executed by altering the order n of low-pass digital filter processing, where n is an integer greater than zero, e.g. to select second-order low-pass filter operation (n=2) or third-order low-pass filter operation (n=3), in accordance with the wheel velocity $V_W$. The period of the velocity sensing pulse train signal (produced as described hereinabove referring to FIG. 3) varies in accordance with the value of wheel velocity $V_W$, i.e. increases as the wheel velocity is reduced. Thus, the sampling period of successive wheel velocity measurement operations which are based on this pulse train signal will also be lengthened in accordance with a reduction of wheel velocity. For this reason, if feedback control is executed in accordance with the wheel acceleration $\dot{V}_{W(n)}$ during filter processing, the accuracy of response of the wheel acceleration computation processing to sudden variations in acceleration may deteriorate. For that reason, with the third embodiment, the order n of the digital filter processing is made small when the wheel velocity is low, to thereby ensure satisfactory response. During a condition of high wheel velocity, a satisfactory response can be attained even with a high value of n, so that in this case the value of n is made relatively high (since a high-order filter will provide more effective high-frequency noise exclusion). In this way, satisfactory filter response and noise exclusion capability can be ensured for both high and low ranges of wheel velocity.

Figure 14:
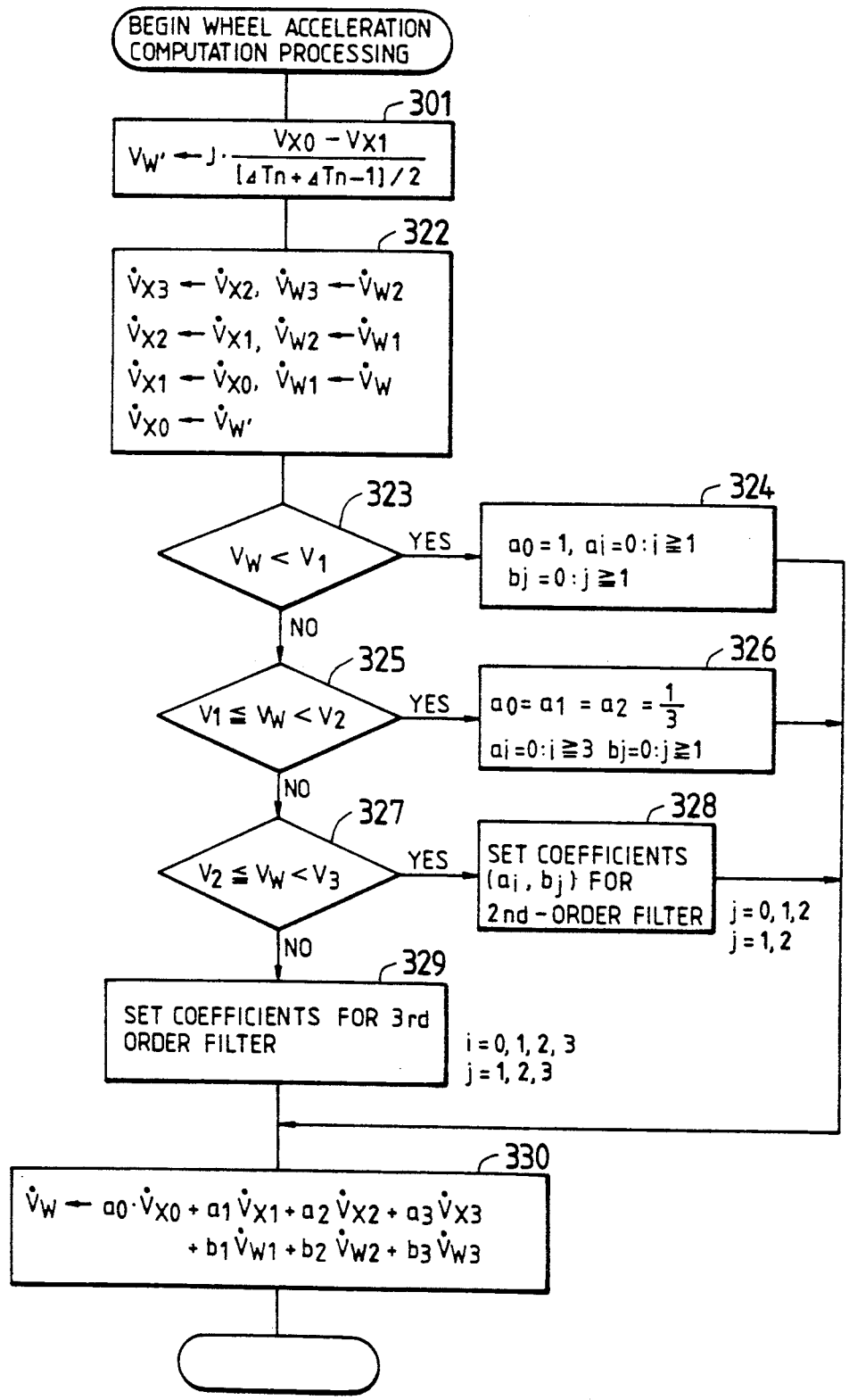

FIG. 14 is a flow chart of the wheel acceleration computation processing for this embodiment, with wheel velocity computation processing (FIG. 6) having been executed immediately previously, as for the preceding embodiments. The processing of step 301 is identical to that of the corresponding step of the first and second embodiments, so that further description will be omitted. The next step 322' is similar to step 322 of the first and second embodiments, but differs in that an additional value of previously obtained instantaneous wheel acceleration is stored in a $\dot{V}_{x3}$ register, and an additional value of previously obtained wheel acceleration is stored in a $\dot{V}_{w3}$ register, to enable a third order digital filter characteristic to be established when required.

In step 323, the wheel velocity $V_W$ is compared with a first reference velocity V1, and if $V_W$ is found to be less than V1, processing proceeds to step 324. In step 324, the filter coefficient $a_0$ is set to 1, filter coefficientfs $a_1$, $a_2$, $b_1$ and $b_2$ each are set to 0. In this way the most recently obtained value of instantaneous wheel acceleration $\dot{V}_{x0}$ is obtained as the new value of wheel acceleration $\dot{V}_W$ in the digital filter processing step 330. If it is found in step 323 that $V_W$ is not less than V1, then processing proceeds to step 325, in which the the wheel velocity $V_W$ is compared with a second reference velocity V2 (where V2 > V1), and if $V_W$ is found to be less than V2, processing proceeds to step 326. In step 326 the filter coefficientfs are set as $a_0=a_1=a_2=\frac{1}{3}$, and $b_1=b_2=0$. As a result, the value of wheel acceleration $\dot{V}_W$ that is subsequently obtained in step 330 is the average of the most recently obtained value of instantaneous wheel acceleration $\dot{V}_{x0}$, the immediately previously obtained value $\dot{V}_{x1}$, and the value $\dot{V}_{x2}$ which had been obtained prior to $\dot{V}_{x1}$.

If it is found in step 325 that $V_W$ is not less than V2, then processing proceeds to step 327, in which the wheel velocity $V_W$ is compared with a third reference velocity V3 (where V3 > V2), and if $V_W$ is found to be less than V3, processing proceeds to step 28. In step 328 the filter coefficients ($a_i$, $b_j$) are set to respective values which will produce a second-order low pass filter characteristic.

If it is found in step 327 that $V_W$ is not less than V3, then processing proceeds to step 329, in which the filter coefficients ($a_i$, $b_j$) are set to respective values which will produce a third-order low pass filter characteristic.

In the next step 330, as in the first and second embodiments, the wheel acceleration $\dot{V}_W$ is computed using the values of filter coefficients ($a_i$, $b_j$) that have been set in step 324, 326, 328 or 329.

The digital filter coefficient values for ($a_i$, $b_j$) that are set in step 328 or 329 are derived beforehand for the respective velocity ranges, and stored in a memory of the microcomputer of the ECU 10.

Thus with the third embodiment as described above, the order n of the digital low pass filter processing is made increasingly higher in accordance with the increases in the of wheel velocity $V_W$. This ensures that satisfactory filter response is obtained in the low range of wheel velocity, while optimum exclusion of high frequency noise components from the finally obtained value of wheel acceleration $\dot{V}_W$ is attained together with a satisfactory filter response in the high range of wheel velocity.

As for the second embodiment, it would be possible to derive a value of vehicle velocity and to utilize that for comparison with reference velocity values, to determine the respective velocity ranges with the third embodiment.

Furthermore although the third embodiment could be utilized alone, it is possible to obtain improved results if the third embodiment is combined with the first and second embodiments, i.e. with the filter cut-off frequency being altered in accordance with wheel velocity and whether a wheel is driving or driven, in addition to the order of the filter being determined as described above.

A fourth embodiment of the invention will be described in which wheel acceleration computation processing is executed by varying the frequency characteristic of the digital low pass filter processing in accordance with the wheel velocity $V_W$. As described hereinabove, it is preferable to emphasize the response of filter processing (i.e. accuracy of response to rapid variations in the successive instantaneous wheel acceleration values) for the high velocity region of operation, and to emphasize stability and effective noise exclusion for filter processing in the low velocity region of operation. In order to satisfy both of these requirements with the fourth embodiment, a Chebyshev characteristic is established for the digital low pass filter processing during operation in the low velocity range, and a Butterworth characteristic is established for the filter processing in the high velocity range. With a Chebyshev characteristic, there is a certain amount of ripple in the passband of the filter frequency characteristic. However a sharp cut-off in that characteristic, and hence excellent exclusion of high frequency noise components can be obtained. With the Butterworth characteristic on the other hand, the frequency characteristic of the filter is substantially flat within the passband, so that better stability is obtained.

Figure 15:
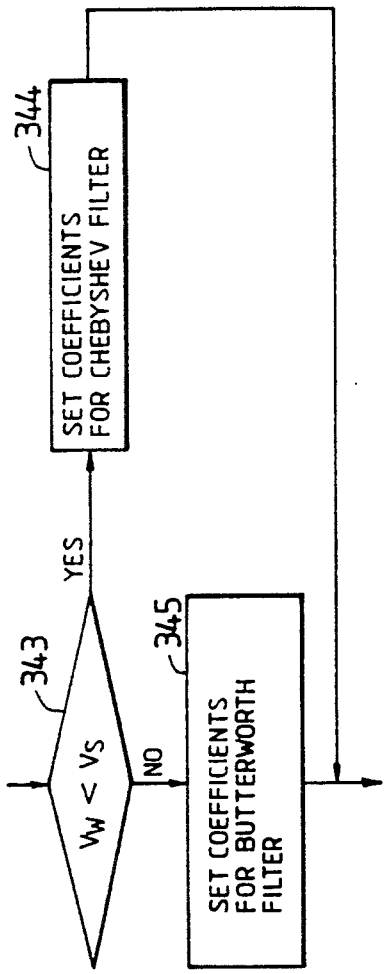

A flow chart for acceleration computation processing with the fourth embodiment can be obtained by replacing the portion indicated by A in FIG. 7 (i.e. steps 303 through 306) by the contents of FIG. 15. In step 343 of FIG. 15, the wheel velocity $V_W$ is compared with a reference velocity Vs. If it is found that $V_W > V_s$, then processing proceeds to step 344. In step 344, the digital filter coefficients ($a_i$, $b_j$) are set to respective values which will establish a Chebyshev characteristic for the digital low pass filter characteristic. If it is found that $V_W$ is not less than Vs, then processing proceeds to step 345, in which the digital filter coefficients ($a_i$, $b_j$) are set to respective values which will establish a Butterworth characteristic for the digital low pass filter characteristic.

The fourth embodiment has been described for the case in which one of two different types of low pass filter characteristic is selected on the basis of a single reference velocity. However it would be equally possible to obtain increased accuracy of control by using two values of reference velocity, and to provide a capability for also selecting a Bessel frequency characteristic for the digital low pass filter, which will provide even greater stability than the Butterworth characteristic. In this case, the Chebyshev characteristic would be selected for a low range of wheel velocity, the Butterworth characteristic would be selected for an intermediate range of wheel velocity, and the Bessel characteristic would be selected for a high range of wheel velocity.

As for the second embodiment, it would be be possible to derive a value of vehicle velocity and to utilize that for comparison with a reference velocity value to determine the respective high and low velocity ranges with the fourth embodiment.

Furthermore although the fourth embodiment can be utilized alone, it would be possible to obtain improved results if the fourth embodiment were to be combined with the first, second and third embodiments described hereinabove.

With the first through fourth embodiments of the invention described above, digital filter processing is utilized which can be controlled by a computer program, i.e. by software. It would be possible to implement each of these embodiments by utilizing a digital filter which is in hardware form, or to utilize an analog filter. However from considerations of ease of changing the filter parameters in accordance with whether processing is being executed for a drive wheel or a driven wheel, or in accordance with the wheel velocity, etc, a digital filter that is controlled by software is preferable.

Figure 17:
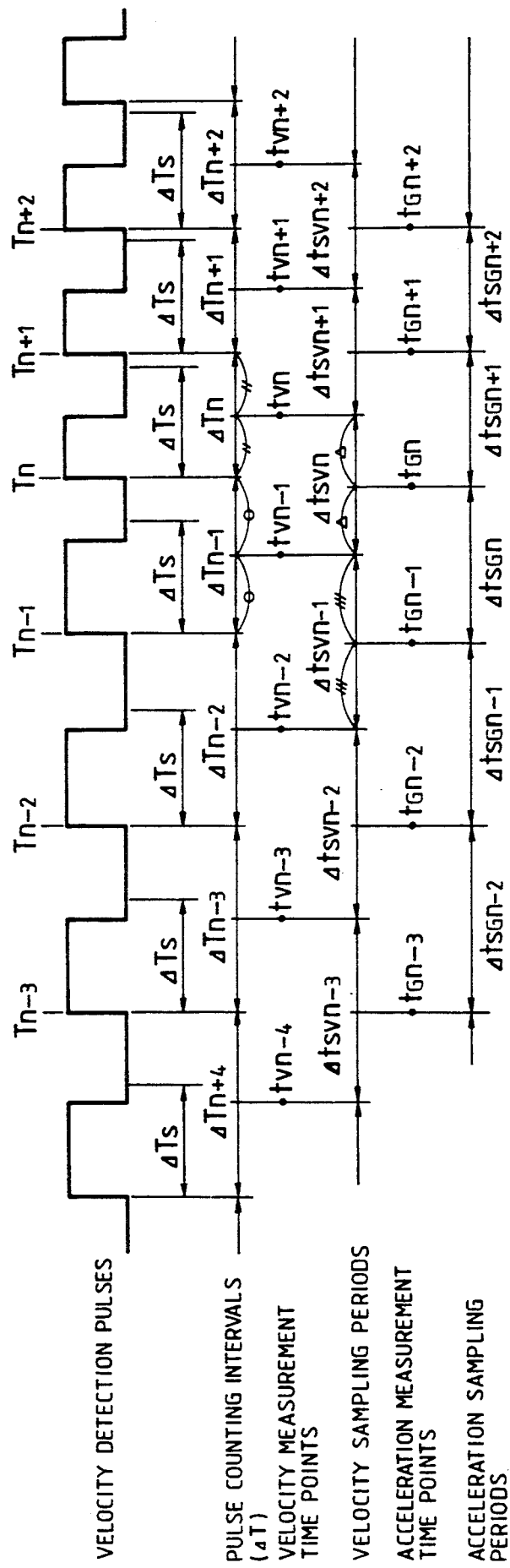
FIG. 17 is a timing diagram for describing the operation of the fifth embodiment.

A digital filter has advantages over an analog type of filter with respect to realizing filter functions which have been hitherto impracticable, and also with respect to enabling high stability to be achieved together with low manufacturing cost. However if a digital filter is used for signal processing as in the first through fourth embodiments above, in which the sampling period of the input signal (i.e. the period with which successive values of instantaneous wheel acceleration are obtained) is not fixed, then problems may arise. Specifically, it is a precondition for using a digital filter that the sampling period be substantially constant. If an input signal is processed whose sampling period is not constant, then an error will arise in the results obtained from the filter processing, with the magnitude of this error increasing in accordance with an increase in the deviation of the sampling period of the input signal from a correct sampling period which is in accordance with the values of the filter coefficients. As stated hereinabove, the value of the sampling period $\Delta T$ will be substantially constant and approximately equal to $\Delta T_s$ if the wheel velocity is sufficiently high. However if the wheel velocity falls to a level such that the period of the wheel detection pulses becomes comparable to the value of $\Delta T_s$, then the sampling period will fluctuate significantly. A fifth embodiment will be described in the following in which this problem is overcome by varying the values of the digital filter coefficients in accordance with changes in the sampling period. However if it were attempted to implement this by directly utilizing successive values of the period ΔT, then practical problems would arise. In FIG. 17, for example, the topmost waveform illustrates a case in which only one velocity sensing pulse occurs within each sampling period ΔT, so that large variations in the sampling period occur. It will be apparent that under such a condition, when for example the period of the wheel detection pulses changes between a value slightly greater than ΔTs to being slightly less than ΔTs, a large change will immediately occur in the value of the sampling period ΔT.

Figure 16:
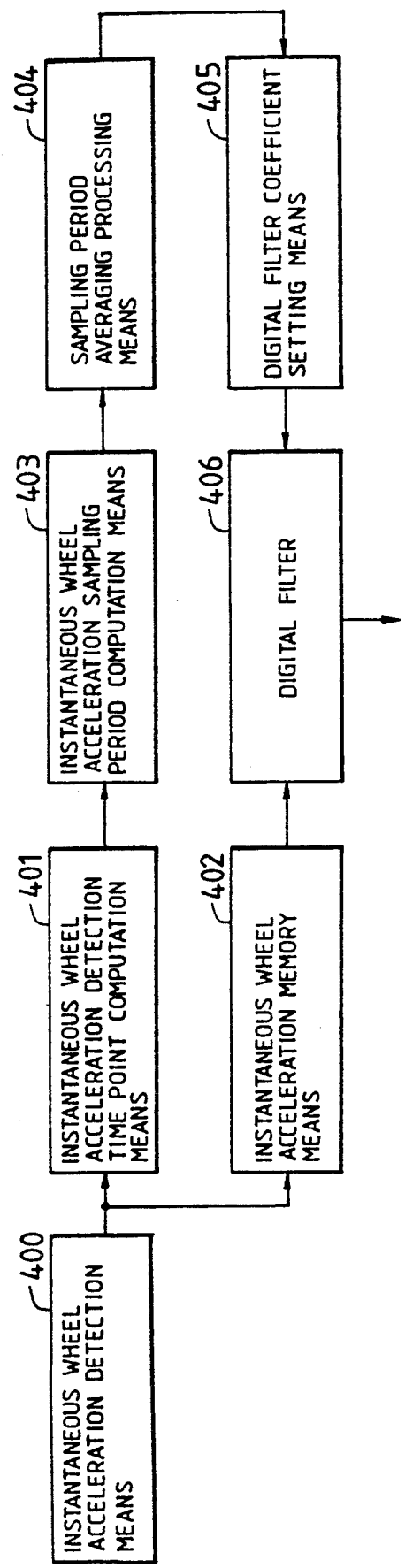
FIG. 16 is a block diagram for illustrating the basic principles of a fifth embodiment of an anti-skid apparatus according to the present invention.

A fifth embodiment of the invention will now be described whereby the amount of error contained in the output signal obtained from digital filter processing can be reduced to a level that is sufficiently small to be ignored, in spite of such variations in the sampling frequency of the filter input signal, by obtaining successive new values of sampling period each of which is derived by interpolation processing of a plurality of successive sampling periods, to thereby obtain averaged values of sampling period which do not exhibit the aforementioned sudden large-amplitude changes in value when the period of the wheel detection pulses is comparable to the sampling period ΔT. FIG. 16 is a block diagram to illustrate the basic principles of this embodiment. The operation is as follows. The instantaneous wheel acceleration detection means 400 obtains values of instantaneous wheel acceleration $V'_W$. In this embodiment, the instantaneous wheel acceleration detection means is implemented by wheel velocity sensors and an ECU. The point in time at which each instantaneous wheel acceleration $V'_W$ was obtained (i.e. the timing of the end of the corresponding sampling period ΔT) is stored in instantaneous wheel acceleration detection time point detection means 401, which in this embodiment includes dedicated registers. Based upon a plurality of these stored detection time point, the sampling period averaging processing means 404 executes averaging processing of the sampling period of the instantaneous wheel acceleration $\dot{V}'_w$. Next, digital filter processing is executed by the digital filter 406 of successively obtained values of instantaneous wheel acceleration, extending from the most recently obtained value, as for the previous embodiments, with the digital filter coefficients being set by the digital filter coefficient setting means 405. In this embodiment, the sampling period averaging processing means 404 is implemented by operations of the microcomputer of the ECU 10. However it would be equally possible to use a dedicated processor for this purpose. Values of instantaneous wheel acceleration $\dot{V}'_W$ that are detected by the instantaneous wheel acceleration detection means 400 are stored in respective registers of the instantaneous wheel acceleration memory means 402 (i.e. the $\dot{V}_{x0}$ registers etc., of the previous embodiments). Digital filter processing is executed by the digital filter of the stored successively obtained values of instantaneous wheel acceleration, using filter coefficient values that have been derived based on upon sampling period values obtained from the sampling period averaging processing.

Thus with this embodiment, averaging processing is executed of the sampling period of a signal which does not have a fixed sampling period, and digital filter coefficients are set in accordance with the results obtained from this averaging processing, with digital filter processing of the input signal then being executed As a result, the output signal (representing wheel acceleration $V_W$) that is obtained from the digital filter processing will contain only a negligible amount of error.

The operation of this embodiment will be described in detail referring to the timing diagram of FIG. 17 (in which a low value of wheel velocity is assumed, with only one wheel velocity detection pulse occurring in each interval ΔT) and the flow chart of FIG. 18. As shown in FIG. 17, a fixed value of a time interval ΔTs (described hereinabove referring to FIG. 8) is set, for use in counting the wheel velocity detection pulses to obtain successive count values Np of wheel velocity detection pulses, which vary in accordance with successive values of instantaneous wheel velocity. As described previously referring to FIG. 8, the time interval which elapses from a rising edge of a wheel velocity detection pulse (which acts as a first interrupt pulse of a pulse count interval) until the rising edge of the next wheel velocity pulse to occur after the time interval ΔTs has elapsed is a pulse measurement time interval ΔTn, during which a number of wheel velocity detection pulses Np is counted. A time point which occurs midway within the pulse measurement time interval ΔTn is first determined, that point being designated in the following as a wheel velocity measurement time point $t_{V(n)}$. A sampling interval $\Delta t_{SV(n)}$ for the instantaneous wheel velocity $V'_w$ is then obtained as the difference between the wheel velocity measurement time point $t_{V(n)}$ and the immediately preceding wheel velocity measurement time point $t_{V(n-1)}$. The time point at the center of the sampling interval $\Delta t_{sv(n)}$ is then determined, that point being designated as an instantaneous wheel acceleration measurement time point $t_{g(n)}$. A sampling interval $\Delta t_{sg(n)}$ for the instantaneous wheel acceleration $V'_w$ is then obtained as the time difference between $t_{g(n)}$ and the precedingly obtained value $t_{g(n-1)}$. Successive ones of the above time point values are obtained in successive ΔT intervals, and stored temporarily until required for computation purposes, in registers (not shown in the drawings). The average of two consecutive ones of these instantaneous wheel acceleration sampling intervals is then obtained from the following equation, and the resultant value is used as the sampling period value for deriving the filter coefficients used in a digital filter processing step that is executed to obtain a value of wheel acceleration corresponding to the time interval ΔTn (i.e. filter processing in which the acceleration value $\dot{V}_{x0}$ used in step 307 corresponds to the interval ΔTn, the value of $V_{xI}$ corresponding to ΔT$_{n-1}$ and so on).

$$\Delta t'_{SGn} = \frac{\Delta t_{SGn} + \Delta t_{SGn-1}}{2}$$

Figure 18:
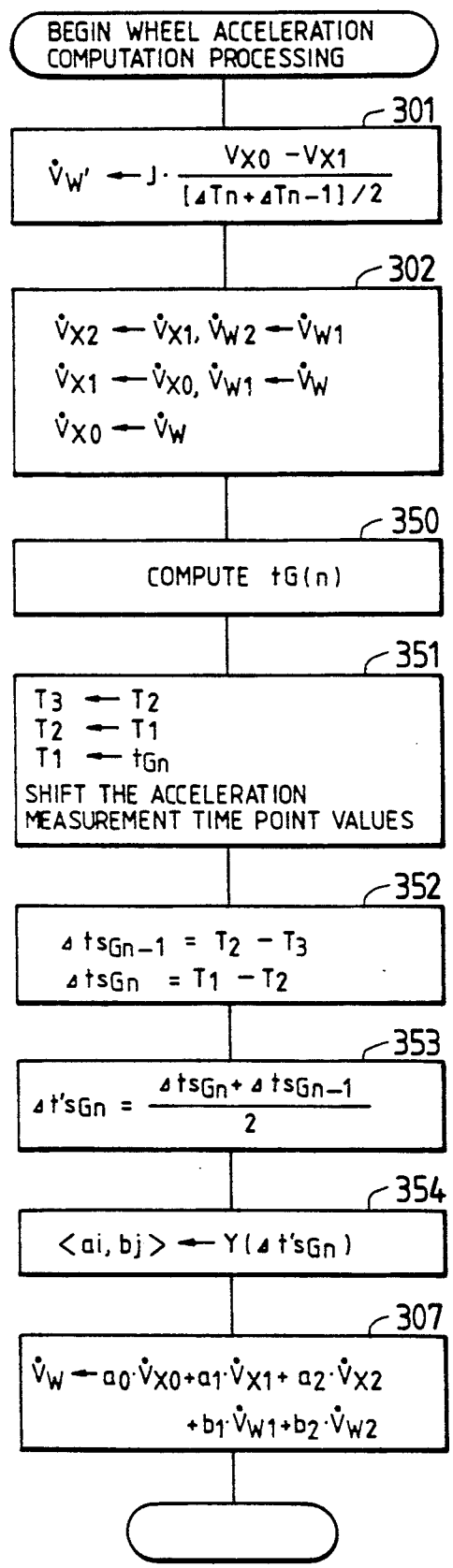
FIG. 18 is a flow chart for describing the operation of the fifth embodiment; and, FIG. 19 is a diagram for illustrating a modification of the fifth embodiment, whereby values of acceleration measurement time points are determined by interpolation from values derived by sampling period averaging processing.

The flow chart of the above processing is shown in FIG. 18. It is assumed in FIG. 18 that the wheel velocity has already been obtained, and only the subsequent processing is shown. The steps which are identical to steps of FIG. 13 are indicated by corresponding numerals, and further description of these will be omitted.

In step 350, which follows immediately after step 302 of shifting the acceleration values stored in the $\dot{V}_{x2}$ registers etc, $T_{G(n)}$ is computed. Specifically, the average of the starting and ending time points $T_{(n)}$ and $T_{(n+1)}$ of the pulse measurement time interval ΔTn shown in FIG. 17 is computed, to thereby obtain the instantaneous wheel velocity time point measurement time point tV(n). The average is then obtained of $t_{V(n)}$ and the value tV(n+1) (which is derived in the same way as for $t_{V(n)}$), to thereby obtain the instantaneous wheel velocity measurement time point $t_{G(n+1)}$ However it would be also possible to take the average of $t_{V(n)}$ and the value $t_{V(n+2)}$, and to use that average value as the instantaneous wheel velocity measurement time point $t_{G(n+1)}$ This would enable the computation of $t_{G(n+1)}$ to be substantially shortened, so that the computation time required to compute $t_{G(n+1)}$ could be reduced.

In step 351, the value $t_{G(n)}$ which has just been computed is stored in a register T1, the value $t_{G(n-1)}$ which had been previously computed and stored in register T1 is transferred to a register T2, while the value $T_{G(n-2)}$ which had been computed prior to $t_{G(n-1)}$ and stored in register T2 is transferred to a register T3.

In step 352, the sampling period $T_{SG(n)}$ is computed from the instantaneous wheel acceleration measurement time point $t_{g(n)}$ which has been computed and stored.

In step 353, the average is obtained of the sampling period $\Delta t_{SG(n)}$ which has just been computed in step 352 and the value $\Delta t_{SG(n-1)}$ which had been previously computed, and this average value becomes the new sampling period $\Delta t'_{SG(n)}$.

In step 354, the new value of sampling period $\Delta t'_{SG(n)}$ obtained in step 353 is used to set the respective values of the digital filter coefficients ($a_i$, $b_j$). The values of these filter coefficients ($a_i$, $b_j$) may be obtained by using a table stored in the computer memory, i.e. a memory map, which relates predetermined sets of filter coefficient values with values for $\Delta t'_{SG(n)}$. Alternatively, predetermined functions can be used to compute the respective values of the filter coefficients ($a_i$, $b_j$) in accordance with the value of $\Delta t'_{SG(n)}$. Filter processing of the instantaneous velecity values from the $\dot{V}_{x0}$ registers etc. is then executed in step 307.

Although for simplicity of description in the above it is stated that time points $t_{Gn}$ etc., are temporarily stored in registers, this of course signifies that data values representing these time points are stored. That is, reference timings are cyclically defined by an internal clock signal of the computer of the ECU 10, and the aforementioned time points are respectively represented as values of elapsed time relative to these reference timings.

With this fifth embodiment, a new value of acceleration sampling period $\Delta t'_{SG(n)}$ is derived, by interpolation computations using the start and end time points of actual sampling periods, and used to determine the values of filter coefficients that are utilized each time that an updated value of wheel acceleration $\dot{V}_W$ is computed by the filter processing of step 307, i.e. values for the filter coefficients ($a_i$, $b_j$) are established in accordance with the new sampling period and are then utilized in that filter processing step. This procedure, in itself, will result in enhanced accuracy for the value of wheel acceleration $\dot{V}_W$ that is obtained from the filter processing. However if in addition to this, interpolation is executed to obtain new values of instantaneous wheel acceleration, in addition to the interpolation of successive acceleration measurement time points $t_{G(n)}$ to obtain new values of sampling period $\Delta t'_{SG(n)}$, with the filter coefficients being determined as described for the fifth embodiment, then an even greater degree of accuracy of filter processing can be obtained. This will be described for a sixth embodiment, which is otherwise identical to the fifth embodiment described above.

With the fifth embodiment, new values of sampling period $\Delta t'_{SGn}$ are successively computed, to replace each of the $\Delta T_n$ pulse measurement intervals. However since these new values of sampling period are different in timing and duration from the corresponding original $\Delta T$ values, they do not precisely accurately correspond to the instantaneous wheel acceleration values that are used in the filter processing step 307. A sixth embodiment will be described in which this problem is overcome by computing an interpolated value of instantaneous wheel acceleration, which is used during the filter processing step 307 in place of the value held in the $\dot{V}_{x1}$ register. The contents of the $\dot{V}_{x0}$ to $\dot{V}_{x2}$ registers will be referred to as the $\dot{V}_n$, $\dot{V}_{n-1}$ and $\dot{V}_{n-2}$ values of instantaneous wheel acceleration respectively. With this sixth embodiment as illustrated in FIG. 19, prior to executing the filter processing step 307, an acceleration measurement time point $t'_{G(n-1)}$ is derived in accordance with the new value of sampling period $\Delta t'_{SG(n)}$, which is obtained as for the fifth embodiment. The relationship between this new time point $t'_{SG(n)}$ and the points $t_{G(n-2)}$, $t_{G(n-1)}$ and $t_{G(n)}$ is as shown in FIG. 19. As shown, $t'_{G(n-1)}$ is obtained as a point which is midway between the time points $T_{G(n-2)}$ and $t_{G(n)}$. The value of instantaneous wheel acceleration $V'_{(n-1)}$ that corresponds to the acceleration measurement time point $t'_{G(n-1)}$ is then computed using the following equation:

$$\dot{V}_{n-1} = \begin{cases} \left( \dfrac{\dot{V}_{n-1} - \dot{V}_{n-2}}{\Delta t_{SGn-1}} \times \Delta t'_{SGn} \right) + \\ \dot{V}_{n-2} \; (\because \; t'_{Gn-1} < t_{Gn-1}) \\ \left\{ \dfrac{\dot{V}_n - \dot{V}_{n-1}}{\Delta t_{SGn}} \times (\Delta t_{SGn} - \Delta t'_{SGn}) \right\} + \\ \dot{V}_{n-1} \; (\because \; t'_{Gn-1} > t_{Gn-1}) \end{cases}$$

Digital low pass filter processing is executed in the same way as for the previous embodiments, e.g. as in step 307 of FIG. 18. However with the sixth embodiment, the new value of instantaneous wheel acceleration $\dot{V}'_{(n-1)}$ obtained from the above equation is utilized during digital filter processing in step 307, in place of the value (i.e. $\dot{V}_{n-1}$) that is held in the $\dot{V}_{x1}$ register.

Thus with this sixth embodiment described above, a new value of sampling period $\Delta t'_{SG(n)}$ (and corresponding start/end time points) is computed, and an interpolated new value of acceleration measurement time point $t'_{G(n-1)}$ is computed, with a new value of instantaneous wheel acceleration $\dot{V}'_{n-1}$ being computed by interpolation processing using these time points and previously obtained values of instantaneous wheel acceleration obtained from respective registers. Digital filter processing is executed, to obtain an updated value of wheel acceleration $\dot{V}_W$ is then executed as in the preceding embodiments, with the filter coefficient values being determined in accordance with the interpolated value of sampling period, as for the fifth embodiment, but with the interpolated value $\dot{V}_{n-1}$ being used in place of the value from the $\dot{V}_{x1}$ register. Enhanced accuracy of filter processing can thereby be obtained.

It should be noted that the fifth and sixth embodiments described above are not limited in application to a vehicle wheel acceleration processing system, but could equally well be applied to other applications such as control of the operation of a robot, etc., in which it is advantageous to apply a digital filter to execute processing of a signal which does not have a fixed sampling period.

Moreover, if the fifth or sixth embodiment is combined with one or more of the first through fourth embodiments of an anti-skid control apparatus described above, even greater accuracy of digital filter processing, and hence increased precision of the wheel acceleration $\dot{V}_W$ can be obtained.

Table 1 below is an example of sets of filter coefficient values and corresponding values of cut-off frequency, to be stored in microcomputer memory and utilized in setting appropriate coefficient values in accordance with a required value of cut-off frequency, for example as described for the first and second embodiments of the invention hereinabove. The table values are for a sampling period of 5 ms, i.e. the approximate value of sampling period if the fixed time interval $\Delta T_s$ is set as 5 ms.

TABLE 1

| Sampling frequency $f_c$ (Hz) | $a_0$ | $a_1$ | $a_2$ | $b_1$ | $b_2$ |
|---|---|---|---|---|---|
| 10 | 0.01953 | 0.03906 | 0.01953 | 1.56250 | −0.64062 |
| 11 | 0.02344 | 0.04688 | 0.02344 | 1.51950 | −0.61328 |
| . | . | . | . | . | . |
| . | . | . | . | . | . |
| 15 | 0.03906 | 0.08203 | 0.03906 | 1.35156 | −0.51172 |

In the above, the present invention has been described for application to an anti-skid control apparatus of a vehicle. However the invention is of course equally applicable to various other vehicle control purposes, such as a traction control apparatus whereby control is based upon values of wheel acceleration.

What is claimed is:

1. A vehicle control apparatus for a vehicle having a set of road wheels including drive wheels and driven wheels, the apparatus comprising:
   means for controlling a running condition of said vehicle based upon wheel acceleration signals and wheel velocity signals; and
   wheel acceleration signal generating means for generating said wheel acceleration signals and said wheel velocity signals, said wheel acceleration signals representing respective values of rotational acceleration of each of said road wheels of said vehicle, said wheel velocity signals representing respective values of rotational velocity of said wheels, said wheel acceleration signal generating means comprising for each wheel:
      wheel velocity detection means for detecting a velocity of said each wheel and producing data representing said wheel velocity,
      instantaneous wheel acceleration computation means for computing successive values of instantaneous wheel acceleration from said wheel velocity data, and for outputting said successive values as an instantaneous wheel acceleration signal,
      filter processing means for excluding high frequency components from said instantaneous wheel acceleration signal which are above a predetermined filter cut-off frequency and thereby outputting said wheel acceleration signal,
      filter cut-off setting means for setting said filter cut-off frequency in accordance with a specific condition of said wheel, in which said wheels comprise drive wheels and driven wheels, and said filter cut-off setting means setting said cut-off frequency to a first predetermined value when said wheel acceleration is computed for a drive wheel and to a second predetermined value when said wheel acceleration is computed for a driven wheel, said first predetermined value being lower than said second predetermined value.

2. A vehicle control apparatus for a vehicle having a set of road wheels, the apparatus comprising:
   means for controlling a running condition of said vehicle based upon wheel acceleration signals and wheel velocity signals; and
   wheel acceleration signal generating means for generating said wheel acceleration signals and said wheel velocity signals, said wheel acceleration signals representing respective values of rotational acceleration of each of said set of road wheels of said vehicle, said wheel velocity signals representing respective values of rotational velocity of said wheels, said wheel acceleration signal generating means comprising for each wheel;
   wheel velocity detection means for detecting a velocity of said each wheel and producing data representing said wheel velocity,
   instantaneous wheel acceleration computation means for computing successive values of instantaneous wheel acceleration from said wheel velocity data and outputting said successive values as an instantaneous wheel acceleration signal,
   filter processing means for excluding high frequency components from said instantaneous wheel acceleration signal which are above a predetermined filter cut-off frequency and outputting said wheel acceleration signal representing a value of acceleration of said wheel, and
   filter cut-off setting means for setting said filter cut-off frequency in accordance with a specific condition of said wheel, said filter cut-off frequency setting means comprising coefficient memory means for storing a plurality of sets of filter coefficients ((a$_i$, B$_j$)) respectively corresponding to a plurality of values of said cut-off frequency, said setting means outputting to said filter means one of said stored sets of filter coefficients as coefficients of said filter means;
   said filter processing means periodically executing a processing sequence in which one of said instantaneous wheel acceleration values and said wheel acceleration signal are updated and sequentially derived, said filter processing means executing said processing sequence based on said selected set of filter coefficients ((a$_i$, b$_j$)) to obtain a new value of wheel acceleration ($\dot{V}_W$) from a relationship:

$$\dot{V}_W = a_0 \cdot \dot{V}_{x0} + a_1 \cdot \dot{V}_{x1} + a_2 + b_1 \cdot \dot{V}_{W1} + b_2 \cdot \dot{V}_{W2}$$

where $\dot{V}_{x0}$ is a value of instantaneous wheel acceleration derived in a current execution of said processing sequence, $\dot{V}_{x1}$ is a value of instantaneous wheel acceleration derived in an execution of said processing sequence immediately prior to that of $\dot{V}_{x0}$, $\dot{V}_{x2}$ is a value of instantaneous wheel acceleration derived in an execution of said processing sequence immediately prior to that of $V_{z1}$, $V_{w1}$ is a value of wheel acceleration derived in an immediately preceding execution of said processing sequence, and $V_{w2}$ is a value of wheel acceleration derived in an execution of said processing sequence immediately prior to that of $V_{w1}$.

3. A vehicle control apparatus for a vehicle having a set of road wheels including drive wheels and driven wheels, the apparatus comprising:

means for controlling a running condition of said vehicle based upon wheel acceleration signals and wheel velocity signals; and wheel acceleration signal generating means for generating said wheel acceleration signals and said velocity signals, said wheel acceleration signals representing respective values of rotational acceleration of each of said road wheels of said vehicle, said wheel velocity signals representing respective values of rotational velocity of said wheels, said acceleration signal generating means comprising for each wheel;

wheel velocity detection means for detecting a velocity of said each wheel and producing said wheel velocity signal representing said wheel velocity, instantaneous wheel acceleration computation means for computing successive values of instantaneous wheel acceleration from said wheel velocity signals and for outputting said successive values as an instantaneous wheel acceleration signal, filter processing means for excluding high frequency components from said instantaneous wheel acceleration signal which are above a predetermined cut-off frequency and outputting said wheel acceleration signal representing a value of acceleration of said wheel, filter coefficient memory means having a plurality of sets of filter coefficient values stored therein respectively corresponding to a plurality of values of cut-off frequency of said filter processing means, and cut-off frequency setting means for selecting a first one of said sets of coefficients from said memory means to be set for said filter processing means to provide a first value of cut-off frequency when processing of a wheel acceleration signal for a drive wheel is being executed, and for selecting a second one of said sets of coefficients from said memory means to be set for said filter processing means to provide a second value of cut-off frequency when processing of a wheel acceleration signal for a driven wheel is being executed, said first value of cut-off frequency being lower than said second value.

4. A vehicle control apparatus for a vehicle having a set of road wheels, the apparatus comprising:

means for controlling a running condition of said vehicle based upon wheel acceleration signals and wheel velocity signals; and wheel acceleration signal generating means for generating said wheel acceleration signals and said velocity signals, said wheel acceleration signals representing respective values of rotational acceleration of each of said road wheels of said vehicle, said wheel velocity signals representing respective values of rotational velocity of said wheels, said acceleration signal generating means comprising for each wheel;

wheel velocity detection means for detecting a velocity of said each wheel and producing said wheel velocity signal representing said wheel velocity, instantaneous wheel acceleration computation means for computing successive values of instantaneous wheel acceleration from said wheel velocity signal and for outputting said successive values as an instantaneous wheel acceleration signal, filter processing means excluding high frequency components from said instantaneous wheel acceleration signal which are above a predetermined filter cut-off frequency and outputting said wheel acceleration signal, filter coefficient memory means having a plurality of sets of filter coefficient values stored therein respectively corresponding to a plurality of values of cut-off frequency of said filter processing means, and cut-off frequency setting means for selecting a first one of said sets of coefficients from said memory means to be set for said filter processing means to provide a first value of cut-off frequency when said wheel velocity is within a predetermined high range, and for selecting a second one of said sets of coefficients from said memory means to be set for said filter processing means to provide a second value of cut-off frequency when said wheel velocity is within a predetermined low range, said first value of cut-off frequency being higher than said second value.

5. A vehicle control apparatus for a vehicle having a set of road wheels, the apparatus comprising:

means for controlling a running condition of said vehicle based upon wheel acceleration signals and wheel velocity signals; and wheel acceleration signal generating means for generating said wheel acceleration signals and said wheel velocity signals, said wheel acceleration signals representing respective values of rotational acceleration of each of said road wheels of said vehicle, said wheel velocity signals representing respective values of rotational velocity of said wheels, said acceleration signal generating means comprising for each wheel;

wheel velocity detection means for detecting a velocity of said wheel and producing said wheel velocity signal representing said wheel velocity, instantaneous wheel acceleration computation means for computing successive values of instantaneous wheel acceleration from said wheel velocity signal and for outputting said successive values as an instantaneous wheel acceleration signal, filter processing means for excluding high frequency components from said instantaneous wheel acceleration signal which are above a predetermined cut-off frequency and outputting said wheel acceleration signal, filter coefficient memory means having a plurality of sets of filter coefficient values stored therein respectively corresponding to a plurality of values of cut-off frequency of said filter processing means, and cut-off frequency setting means for selecting a first one of said sets of coefficients from said memory means to be set for said filter processing means to establish a predetermined value of cut-off frequency and to establish an order $n_1$ filter type for said filter processing means when said wheel velocity is in a predetermined high range, and for selecting a second one of said sets of coefficients from said memory means to be set for said filter processing means to establish a predetermined value of cut-off frequency and establish and order $n_2$ filter type for said filter processing means when said wheel velocity is in a predetermined low range, where said order $n_1$ is higher than said order $n_2$.

6. A vehicle control apparatus for a vehicle having a set of road wheels, the apparatus comprising:
  means for controlling a running condition of said vehicle based upon wheel acceleration signals and wheel velocity signals; and
  wheel acceleration signal generating means for generating said wheel acceleration signals and said wheel velocity signals, said wheel acceleration signals representing respective values of rotational acceleration of each of said road wheels of said vehicle, said wheel velocity signals representing respective values of rotational velocity of said wheels, said acceleration signal generating means comprising for each wheel:
    wheel velocity detection means for detecting a velocity of said each wheel and producing said wheel velocity signal representing said wheel velocity,
    instantaneous wheel acceleration computation means for computing successive values of instantaneous wheel acceleration from said wheel velocity signal, and for outputting said successive values as an instantaneous wheel acceleration signal,
    filter processing means for excluding high frequency components from said instantaneous wheel acceleration signal which are above a predetermined cut-off frequency and outputting said wheel acceleration signal,
    filter coefficient memory means having a plurality of sets of filter coefficient values stored therein respectively corresponding to a plurality of values of cut-off frequency of said filter processing means, and
    cut-off frequency setting means for selecting a first one of said sets of coefficients from said memory means to be set for said filter processing means to establish a predetermined value of cut-off frequency and to establish a Chebyshev filter type for said filter processing means when said wheel velocity is in a predetermined low range, and for selecting a second one of said sets of coefficients from said memory means to be set for said filter processing means to establish a predetermined value of cut-off frequency and establish a Butterworth filter type for said filter processing means when said wheel velocity is in a predetermined high range.

7. A vehicle control apparatus for a vehicle having a set of road wheels, the apparatus comprising:
  means for controlling a running condition of said vehicle based upon wheel acceleration signals and wheel velocity signals; and
  wheel acceleration signal generating means for generating said wheel acceleration signals and said wheel velocity signals, said wheel acceleration signals representing respective values of rotational acceleration of each of said road wheels of said vehicle, said wheel velocity signals representing respective values of rotational velocity of said wheels, said acceleration signal generating means comprising for each wheel:
    wheel velocity detection means for detecting successive values of instantaneous wheel velocity of said each wheel during corresponding wheel velocity sampling periods and for deriving a wheel velocity value from said instantaneous wheel velocity values, the durations of said sampling periods varying in accordance with said instantaneous wheel velocity,
    sampling period averaging processing means for deriving successive values of acceleration sampling periods from successive sets of said wheel velocity sampling periods,
    instantaneous wheel acceleration computation means for computing successive values of instantaneous wheel acceleration from said wheel velocity value, and for outputting said successive instantaneous wheel acceleration values as an instantaneous wheel acceleration signal,
    filter processing means for excluding high frequency components from said instantaneous wheel acceleration signal which are above a predetermined filter cut-off frequency and outputting said wheel acceleration signal,
    filter coefficient memory means having a plurality of sets of filter coefficients stored therein respectively corresponding to a plurality of values of said acceleration sampling periods, and
    filter coefficient setting means for successively selecting sets of said stored filter coefficients to be set for said filter processing means in accordance with said values of acceleration sampling periods.

8. A vehicle control apparatus for a vehicle having a set of road wheels, the apparatus comprising:
  means for controlling a running condition of said vehicle based upon wheel acceleration signals and wheel velocity signals; and
  wheel acceleration signal generating means for generating said wheel acceleration signals and said wheel velocity signals, said wheel acceleration signals representing respective values of rotational acceleration of each of said road wheels of said vehicle, said wheel velocity signals representing respective values of rotational velocity of said wheels, said acceleration signal generating means comprising for each wheel:
    wheel velocity detection means for detecting successive values of instantaneous wheel velocity of said each wheel during corresponding wheel velocity sampling periods and for deriving a wheel velocity value from said instantaneous wheel velocity values, the durations of said sampling periods varying in accordance with said instantaneous wheel velocity,
    sampling period averaging processing means for deriving successive values of acceleration sampling periods and interpolated time point values from successive sets of said wheel velocity sampling periods, instantaneous wheel acceleration computation means for computing successive values of instantaneous wheel acceleration from said wheel velocity value, and for outputting said successive instantaneous wheel acceleration values as an instantaneous wheel acceleration signal, instantaneous wheel acceleration averaging processing means for deriving successive interpolated values of instantaneous wheel acceleration based upon sets of successive ones of said instantaneous wheel acceleration values from said instantaneous wheel acceleration computation means and upon said interpolated time point values produced from said sampling point averaging processing means, filter processing means for excluding high frequency components from said interpolated values of instantaneous wheel acceleration which are above a predetermined filter cut-off frequency and outputting said wheel acceleration signal, filter coefficient memory means having a plurality of sets of filter coefficients stored therein respectively corresponding to a plurality of values of said acceleration sampling periods, and filter coefficient setting means for selecting sets of said stored filter coefficients to be set for said filter processing means in accordance with said values of acceleration sampling periods.

9. A vehicle control apparatus for controlling a running condition of a vehicle having a road wheel, the control apparatus comprising:

first means for outputting a wheel velocity signal corresponding to a wheel rotational velocity of said wheel;

second means for computing and outputting an instantaneous wheel acceleration signal in response to said wheel velocity signal;

third means for outputting a wheel acceleration signal derived by excluding from said instantaneous wheel acceleration signal frequency components that are higher than a predetermined cut-off frequency;

fourth means for judging a condition of said wheel;

fifth means for varying the cut-off frequency of said third means in accordance with said wheel condition; and running control means for controlling said running condition of said vehicle based upon said wheel acceleration signal.

10. A vehicle control apparatus according to claim 9, in which said fourth means judges, as said wheel condition, whether the wheel is a drive wheel or a driven wheel.

11. A vehicle control apparatus according to claim 10, in which said fifth means lowers said cut-off frequency when said wheel is judged to be a drive wheel.

12. A vehicle control apparatus according to claim 9, wherein the condition that is judged by said fourth means is a value of said wheel velocity signal.

13. A vehicle control apparatus according to claim 12, wherein said fifth means increases said cut-off frequency when said wheel velocity signal value is high.

14. A vehicle control apparatus for controlling a running condition of a vehicle having a road wheel, the apparatus comprising:

first means for outputting a wheel velocity signal corresponding to a wheel rotational velocity of said wheel;

second means for computing and outputting an instantaneous wheel acceleration signal $\dot{V}_{xi}$ in response to said wheel velocity signal;

a digital filter for performing digital filter processing by successively executing a computation using the following equation, said digital filter obtaining a wheel acceleration signal designated a $\dot{V}_W$ from the instantaneous wheel acceleration signal $\dot{V}_{xi}$ by excluding from said instantaneous wheel acceleration signal $\dot{V}_{xi}$ frequency components which are higher than a predetermined cut-off frequency:

$$\dot{V}_W = \sum_{i=0}^{n} a_i \cdot \dot{V}_{Xi} + \sum_{j=0}^{n} b_j \cdot \dot{V}_{Wj},$$

where $\dot{V}_{Wj}$ denotes values of wheel acceleration signals which have been obtained by preceding executions of said computation, n denotes an order of the digital filter, and $a_i$ and $b_j$ denote digital filter coefficients;

third menas for judging a condition of said wheel;

fourth means for altering at least one of said digital filter coefficients $a_i$, $b_j$ and said digital filter order n of said digital filter in accordance with said wheel condition; and running control means for controlling said running condition of said vehicle based upon said wheel acceleration signal $\dot{V}_W$.

15. A vehicle control apparatus according to claim 14, wherein the order of said digital filter is equal to two and in which filter processing by said digital filter is executed in accordance with the following equation:

$$\dot{V}_W = a_0 \cdot \dot{V}_{X0} + a_1 \cdot \dot{V}_{X1} + a_2 \cdot \dot{V}_{X2} + b_1 \cdot \dot{V}_{W1} + b_2 \cdot \dot{V}_{W2}$$

16. A vehicle control apparatus according to claim 14, in which said third means judges, as said wheel condition, whether said wheel is a drive wheel or a driven wheel said fourth means altering said digital filter coefficients to change said cut-off frequency such that said cut-off frequency is lowered when said wheel is judged to be a drive wheel.

17. A vehicle control apparatus according to claim 14, wherein the condition that is judged by said third means is a value of said wheel velocity signal, said fourth means altering said digital filter coefficients to change said cut-off frequency such that said cut-off frequency is increased when said wheel velocity signal value is high.

18. A vehicle control apparatus according to claim 14, wherein the condition that is judged by said third means is a value of said wheel velocity signal, said fourth means increasing said order of the digital filter when said wheel velocity signal value is high.

19. A vehicle control apparatus according to claim 14, wherein said third means judges, as said wheel condition, whether a value of said wheel velocity signal corresponds to a high wheel velocity range or to a low wheel velocity range, said fourth means setting said digital filter coefficients such as to establish a Butterworth type of characteristic as a filter characteristic of said digital filter when the wheel velocity signal value corresponds to said high wheel velocity range, said fourth means setting said coefficients such as to establish a Chebyshev type of characteristic as said digital filter characteristic when the wheel velocity signal value corresponds to said low wheel velocity range.

20. A vehicle control apparatus according to claim 14, further comprising:
- means for determining and storing time points at which values of said instantaneous wheel acceleration signal are computed by said second means;
- means for calcualting, based on the stored time points sampling periods of said instantaneous wheel acceleration signal;
- averaging processing means for executing averaging processing of the calculated sampling periods to obtain an averaged sampling period; and
- updating means for updating the values of said digital filter coefficients in accordance with a value of the averaged sampling period.

21. A vehicle control apparatus according to claim 20, further comprising interpolation means for executing interpolation of time points between said time points at which values of the instantaneous wheel acceleration signal were computed, and for interpolating said values of the instantaneous wheel acceleration signal.

22. A vehicle control apparatus according to claim 21, in which said interpolated values $\dot{V}'_{n-1}$ of the instantaneous wheel acceleration signal are derived from the following equation:

$$\dot{V}_{n-1} = \begin{cases} \left( \dfrac{\dot{V}_{n-1} - \dot{V}_{n-2}}{\Delta t_{SGn-1}} \times \Delta t'_{SGn} \right) + \\ \dot{V}_{n-2} \ (\because t'_{Gn-1} < t_{Gn-1}) \\ \left\{ \dfrac{\dot{V}_n - \dot{V}_{n-1}}{\Delta t_{SGn}} \times (\Delta t'_{SGn} - \Delta t'_{SGn}) \right\} + \\ \dot{V}_{n-1} \ (\because t'_{Gn-1} < t_{Gn-1}) \end{cases}$$

in which $\dot{V}_n$ denotes a value of instantaneous wheel acceleration derived in a current processing step, $\dot{V}_{n-1}$ denotes a value of instantaneous wheel acceleration derived in an immediately preceding processing step, $\dot{V}_{n-2}$ denotes a value of instantaneous wheel acceleration derived in a processing step immediately prior to said immediately preceding processing step, $\Delta t'_{SGn}$ denotes a value of sampling period which hs been subjected to averaging processing, $\Delta t_{SGn}$ denotes a current value of sampling period, $\Delta t_{SGn-1}$ denotes a value of sampling period of an immediately preceding processing step, $t'_{Gn-1}$ denotes an interpolated measurement time point, and $t_{Gn-1}$ denotes an actual measurement time point.

* * * * *